US012043054B2

(12) United States Patent
Higuchi et al.

(10) Patent No.: US 12,043,054 B2
(45) Date of Patent: Jul. 23, 2024

(54) DISPLAY

(71) Applicant: TOPPAN INC., Tokyo (JP)

(72) Inventors: Noriaki Higuchi, Tokyo (JP); Shingo Nonaka, Tokyo (JP); Masami Inokuchi, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/127,356

(22) Filed: Mar. 28, 2023

(65) Prior Publication Data

US 2023/0234388 A1 Jul. 27, 2023

Related U.S. Application Data

(63) Continuation of application No. PCT/JP2021/035622, filed on Sep. 28, 2021.

(30) Foreign Application Priority Data

Sep. 29, 2020 (JP) ................................ 2020-162943

(51) Int. Cl.

*B42D 25/21* (2014.01)
*B42D 25/342* (2014.01)
*B42D 25/351* (2014.01)
*B42D 25/373* (2014.01)
*B42D 25/435* (2014.01)

(52) U.S. Cl.

CPC ........... *B42D 25/21* (2014.10); *B42D 25/342* (2014.10); *B42D 25/351* (2014.10); *B42D 25/373* (2014.10); *B42D 25/435* (2014.10)

(58) Field of Classification Search

CPC ............................ B42D 25/342; B42D 25/351
USPC ...... 283/72, 74, 75, 87, 91, 94, 98, 111, 901
See application file for complete search history.

(56) References Cited

U.S. PATENT DOCUMENTS

2013/0300101 A1* 11/2013 Wicker ................. B42D 25/00 283/67

FOREIGN PATENT DOCUMENTS

| | | | |
|---|---|---|---|
| JP | H06-40190 | A | 2/1994 |
| JP | 2002-279480 | A | 9/2002 |
| JP | 2005-134718 | A | 5/2005 |
| WO | WO-2009/139396 | A1 | 11/2009 |
| WO | WO-2018/164237 | A1 | 9/2018 |

OTHER PUBLICATIONS

International Searching Authority, "International Search Report," issued in connection with International Patent Application No. PCT/JP2021/035622 dated Nov. 22, 2021.
International Searching Authority, "Written Opinion," issued in connection with International Patent Application No. PCT/JP2021/035622 dated Nov. 22, 2021.

* cited by examiner

*Primary Examiner* — Justin V Lewis
(74) *Attorney, Agent, or Firm* — Foley & Lardner LLP

(57) ABSTRACT

A display technique capable of displaying special images. A display includes a light shielding layer having a plurality of slits arranged at intervals in a width direction thereof, and an image recording layer that faces a first major surface of the light shielding layer at an interval and in which a latent image is recorded, the latent image being rendered visible by being partially concealed by the light shielding layer.

17 Claims, 13 Drawing Sheets

DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/035622, filed on Sep. 28, 2021, which in turn claims the benefit of JP 2020-162943, filed Sep. 29, 2020, the disclosures of all which are incorporated herein by reference in its entirety.

TECHNICAL FIELD

Embodiments of the present invention relate to a display technique.

BACKGROUND

In identification (ID) cards such as employee ID cards, driver's licenses, and student ID cards, fixed information such as a background pattern and individual information such as a name, a number unique to each card, and an expiration date are recorded. Such ID cards are used to identify individuals, for example, in facilities or for entry to and exit from facilities. As measures to prevent counterfeiting and forgery, special printing using special inks is performed on ID cards, and a facial image or a hologram is bonded to the ID cards. The same measures are taken not only for ID cards but also for payment cards, credit cards, automated teller machine (ATM) cards, and membership cards. The same measures are also used for data pages of passports and visas.

However, the recent widespread use of color copying machines and emergence of highly functional photo-plate-making apparatuses lead to enhanced counterfeiting and forgery techniques. This has increased the risk of crimes involving counterfeiting and forgery.

A method may be used in which invisible information unrecognizable in a normal state is recorded in an ID card and the invisible information is recognized using a reader or a recognition tool to determine the authenticity of the ID card. This technique can provide more effective anti-counterfeiting measures due to the invisible information unrecognizable in a normal state.

In order to render invisible information in an ID card visible, for example, a method may be used in which a thin-line or dot pattern is printed in advance on the ID card and a recognition film or a lenticular film interfering with the pattern is superimposed on the pattern to generate moiré. The authenticity of the ID card can be determined according to the presence or absence of moiré or the shape of moiré.

CITATION LIST

Patent Literature

[PTL 1] JP H6-40190 A; [PTL 2] JP 2002-279480 A; [PTL 3] WO2009/139396 A.

SUMMARY OF THE INVENTION

An object of the embodiments of the present invention is to provide a display technique capable of displaying special images.

According to an aspect of the present invention, provided is a display including a light shielding layer having a plurality of slits arranged at intervals in a width direction of the slits, and a first image recording layer that faces a first major surface of the light shielding layer at an interval and in which a first latent image is recorded, the first latent image being rendered visible by being partially concealed by the light shielding layer. The width direction of the slits is a direction in which the slits are repeated. The light shielding layer may be configured such that the slits form a lattice and that the width direction of the slits is the vertical direction of the first latent image. In such a case, the first latent image can be changed by a natural motion of inclining the display in the vertical direction while observing the first latent image.

When the display is placed on a first surface having reflection characteristics different from those of the light shielding layer so that the light shielding layer is located between the first surface and the first image recording layer, and the first image recording layer of the display is illuminated with white light, and in this state, an observer observes the reflected light (this observation condition is hereinafter referred to as a first observation condition), the light shielding layer can exert a concealing effect of partially concealing the first latent image. For example, in the case where the first surface has a lower reflectance than the light shielding layer, portions of the first latent image corresponding to the slits are concealed. Alternatively, in the case where the first surface has a higher reflectance than the light shielding layer, the portions of the first latent image corresponding to the slits are not concealed, and the remaining portions of the first latent image are concealed. Thus, in this case, the observer can visually recognize a first visible image that is displayed when the first latent image is rendered visible by being partially concealed by the light shielding layer.

When the light shielding layer or the first image recording layer of the display is illuminated with white light, and an observer observes the transmitted light (this observation condition is hereinafter referred to as a second observation condition), the light shielding layer also exerts a concealing effect of partially concealing the first latent image. Thus, in this case as well, the observer can visually recognize the first visible image.

When the display is placed on a second surface having a higher reflectance than the light shielding layer so that the first image recording layer is located between the second surface and the light shielding layer, and the light shielding layer of the display is illuminated with white light, and in this state, an observer observes the reflected light (this observation condition is hereinafter referred to as a third observation condition), the light shielding layer can exert a concealing effect of partially concealing the first latent image. That is, the portions of the first latent image corresponding to the slits are not concealed, and the remaining portions of the first latent image are concealed. Thus, in this case as well, the observer can visually recognize the first visible image.

When the display is placed on a third surface having the same characteristics as those of the light shielding layer so that the light shielding layer is located between the third surface and the first image recording layer, and the first image recording layer of the display is illuminated with white light, and in this state, an observer observes the reflected light (this observation condition is hereinafter referred to as a fourth observation condition), the light shielding layer does not exert a concealing effect of partially concealing the first latent image. In this case, the observer cannot visually recognize the first visible image.

The first image recording layer faces the first major surface of the light shielding layer at an interval; thus, the positions of the portions of the first latent image concealed by the light shielding layer are changed when the observation angle is changed under any of the first to third observation conditions. Therefore, for example, the first visible image displayed by the display under any of the first to third observation conditions can be changed according to the observation angle.

Thus, the display can display various images according to the observation condition. That is, the display can display special images.

According to another aspect of the present invention, provided is a display according to the above aspect, wherein a distance from the light shielding layer to the first image recording layer is in a range of 50 μm to 2 mm. If the distance is small, the display is easily broken. If the distance is large, the display has a large thickness. The distance is preferably in a range of 100 μm to 2 mm, in order to achieve high printing accuracy using a typical printer. The distance is more preferably in a range of 150 μm to 1 mm, in order to easily achieve higher printing accuracy.

In the case where the distance is large, the positions of the portions of the first latent image concealed by the light shielding layer are significantly changed when the observation angle is changed under any of the first to third observation conditions. Therefore, for example, the first visible image displayed by the display under any of the first to third observation conditions can be significantly changed according to the observation angle. However, if the distance is excessively large, the observer will perceive image flickering. In order to significantly change the image according to the observation angle without causing the observer to perceive image flickering, the distance is preferably in a range of 100 μm to 800 μm.

According to still another aspect of the present invention, provided is a display according to any of the above aspects, wherein in response to the display being inclined about an axis parallel to a length direction of the plurality of slits, at least one of a color and a shape of a first visible image changes, the first visible image being displayed when the first latent image is rendered visible by being partially concealed by the light shielding layer.

The positions of the portions of the first latent image concealed by the light shielding layer are changed when the inclination angle of the display is changed under any of the first to third observation conditions. Thus, for example, the first image recording layer may be configured such that the display displays a first image as the first visible image when the inclination angle is a first angle under any of the first to third observation conditions and that the display displays, as the first visible image, a second image different from the first image when the inclination angle is a second angle different from the first angle under the corresponding one of the first to third observation conditions. Therefore, the display can further display special images.

According to still another aspect of the present invention, provided is a display according to any of the above aspects, wherein moiré is generated when the first latent image is partially concealed by the light shielding layer.

The first image recording layer may have a periodic arrangement pattern. For example, in the case where the pattern is a strip pattern arranged in the width direction of the first latent image, the length direction and the width direction of the pattern are respectively the same as the length direction and the width direction of the slits, and the arrangement period of the strip pattern is offset from the arrangement period of the slits, moiré can be generated when the first latent image is partially concealed by the light shielding layer. Alternatively, in the case where the arrangement direction of the strip pattern is inclined with respect to the arrangement direction of the slits, moiré can also be generated when the first latent image is partially concealed by the light shielding layer.

According to still another aspect of the present invention, provided is a display according to any of the above aspects, further including a transparent substrate between the light shielding layer and the first image recording layer as a spacer for maintaining a distance between the light shielding layer and the first image recording layer.

According to still another aspect of the present invention, provided is a display according to any of the above aspects, further including a second image recording layer that faces a second major surface of the light shielding layer at an interval and in which a second latent image is recorded, the second latent image being rendered visible by being partially concealed by the light shielding layer.

When the display is placed on a fourth surface having reflection characteristics different from those of the light shielding layer so that the second image recording layer is located between the fourth surface and the light shielding layer, and the first image recording layer of the display is illuminated with white light, and in this state, an observer observes the reflected light (this observation condition is hereinafter referred to as a fifth observation condition), the light shielding layer exerts at least a concealing effect of partially concealing the first latent image. For example, in the case where the fourth surface has a lower reflectance than the light shielding layer, a second visible image displayed when the second latent image is rendered visible by being partially concealed by the light shielding layer is darker than the first visible image displayed when the first latent image is rendered visible by being partially concealed by the light shielding layer. Thus, the observer can visually recognize the first visible image displayed when the first latent image is rendered visible by being partially concealed by the light shielding layer.

When the display is placed on the fourth surface so that the first image recording layer is located between the fourth surface and the light shielding layer, and the second image recording layer of the display is illuminated with white light, and in this state, an observer observes the reflected light (this observation condition is hereinafter referred to as a sixth observation condition), the light shielding layer exerts at least a concealing effect of partially concealing the second latent image. For example, in the case where the fourth surface has a lower reflectance than the light shielding layer, the first visible image displayed when the first latent image is rendered visible by being partially concealed by the light shielding layer is darker than the second visible image displayed when the second latent image is rendered visible by being partially concealed by the light shielding layer. Thus, the observer can visually recognize the second visible image displayed when the second latent image is rendered visible by being partially concealed by the light shielding layer.

When the first image recording layer or the second image recording layer of the display is illuminated with white light, and an observer observes the transmitted light (this observation condition is hereinafter referred to as a seventh observation condition), the light shielding layer exerts a concealing effect of partially concealing the first latent image and a concealing effect of partially concealing the second latent image. Thus, in this case, the observer can visually recognize an image obtained by superimposing the first visible image on the second visible image.

When the display is placed on a fifth surface having the same reflection characteristics as those of the light shielding layer so that the second image recording layer is located between the fifth surface and the light shielding layer, and the first image recording layer of the display is illuminated with white light, and in this state, an observer observes the reflected light (this observation condition is hereinafter referred to as an eighth observation condition), the light shielding layer exerts a concealing effect of partially concealing the second latent image. Thus, when the light shielding layer and the fifth surface have a sufficiently high reflectance, the observer can visually recognize an image obtained by superimposing the first visual image on the second visible image displayed when the second latent image is rendered visible by being partially concealed by the light shielding layer.

When the display is placed on the fifth surface so that the first image recording layer is located between the fifth surface and the light shielding layer, and the second image recording layer of the display is illuminated with white light, and in this state, an observer observes the reflected light (this observation condition is hereinafter referred to as a ninth observation condition), the light shielding layer exerts a concealing effect of partially concealing the first latent image. Thus, when the light shielding layer and the fifth surface have a sufficiently high reflectance, the observer can visually recognize an image obtained by superimposing the second visual image on the first visible image displayed when the first latent image is rendered visible by being partially concealed by the light shielding layer.

The first image recording layer faces the first major surface of the light shielding layer at an interval; thus, the positions of the portions of the first latent image concealed by the light shielding layer are changed when the observation angle is changed under the fifth observation condition. Therefore, for example, the first visible image displayed by the display under the fifth observation condition can be changed according to the observation angle.

The second image recording layer faces the second major surface of the light shielding layer at an interval; thus, the positions of the portions of the second latent image concealed by the light shielding layer are changed when the observation angle is changed under the sixth observation condition. Therefore, for example, the second visible image displayed by the display under the sixth observation condition can be changed according to the observation angle.

Thus, the display can display various images according to the observation condition. That is, the display can display special images.

According to still another aspect of the present invention, provided is a display according to the above aspect, wherein in response to the display being inclined about an axis parallel to the length direction of the plurality of slits, at least one of a color and a shape of a second visible image changes, the second visible image being displayed when the second latent image is rendered visible by being partially concealed by the light shielding layer The positions of the portions of the second latent image concealed by the light shielding layer are changed when the inclination angle of the display is changed under the sixth observation condition. Thus, for example, the second image recording layer may be configured such that the display displays a third image as the second visible image when the inclination angle is a third angle under the sixth observation condition and that the display displays, as the second visible image, a fourth image different from the third image when the inclination angle is a fourth angle different from the third angle under the sixth observation condition. Therefore, the display can further display special images.

According to still another aspect of the present invention, provided is a display according to any of the above aspects, wherein moiré is generated when the second latent image is partially concealed by the light shielding layer.

The second image recording layer may have a periodic arrangement pattern. For example, in the case where the pattern is a strip pattern arranged in the width direction, the length direction and the width direction of the pattern are respectively the same as the length direction and the width direction of the slits, and the arrangement period of the strip pattern is offset from the arrangement period of the slits, moiré can be generated when the second latent image is partially concealed by the light shielding layer. Alternatively, in the case where the arrangement direction of the strip pattern is inclined with respect to the arrangement direction of the slits, moiré can also be generated when the second latent image is partially concealed by the light shielding layer.

According to still another aspect of the present invention, provided is a display according to any of these aspects, wherein a distance from the light shielding layer to the second image recording layer is in a range of 50 μm to 2 mm. If the distance is small, the display is easily broken. If the distance is large, the display has a large thickness. The distance is preferably in a range of 100 μm to 2 mm, in order to achieve high printing accuracy using a typical device. The distance is more preferably in a range of 150 μm to 1 mm, in order to easily achieve higher printing accuracy.

In the case where the distance is large, the positions of the portions of the second latent image concealed by the light shielding layer are significantly changed when the observation angle is changed under the sixth observation condition. Therefore, for example, the second visible image displayed by the display under the sixth observation condition can be significantly changed according to the observation angle. However, if the distance is excessively large, the observer will perceive image flickering. In order to significantly change the image according to the observation angle without causing the observer to perceive image flickering, the distance is preferably in a range of 100 μm to 800 μm. The distance from the light shielding layer to the second image recording layer is preferably equal to the distance from the light shielding layer to the first image recording layer.

According to still another aspect of the present invention, provided is a display according to any of the above aspects, further including a first transparent substrate between the light shielding layer and the first image recording layer as a spacer for maintaining a distance between the light shielding layer and the first image recording layer, and a second transparent substrate between the light shielding layer and the second image recording layer as a spacer for maintaining a distance between the light shielding layer and the second image recording layer.

According to still another aspect of the present invention, provided is a display according to any of the above aspects, wherein a pitch P1 of the plurality of slits is in a range of 50 μm to 500 μm. In consideration of the dimension of colored portions formed by printing or the like and the distance from the first major surface to the image recording layer, the structure in which the pitch P1 is in the above range is suitable, for example, for changing the image under the second observation condition as described above. The pitch can be defined as the average distance between the centers of the slits. More specifically, the pitch may be defined as the average distance between the centers of 10 slits.

The pitch P1 is preferably in a range of 100 to 350 μm. Such a configuration is advantageous for performing stable printing, and is less likely to cause jaggies in the image displayed by the display. The pitch P1 is more preferably in a range of 150 to 300 μm. Such a configuration can achieve a particularly good appearance According to still another aspect of the present invention, provided is a display according to any of the above aspects, wherein a ratio W2/P1 between a width W2 of the plurality of slits and a pitch P1 of the plurality of slits is in a range of 1/5 to 2/3. The ratio W2/P1 is preferably in a range of 1/5 to 1/2, and more preferably in a range of 1/3 to 3/7.

The structure in which the ratio W2/P1 is in the above range is suitable, for example, for displaying the first or second visible image as a bright image and changing the first or second visible image as described above.

According to still another aspect of the present invention, provided is a display according to any of the above aspects, wherein the light shielding layer is a reflector.

According to still another aspect of the present invention, provided is a display according to any of the above aspects, wherein the light shielding layer is a vapor-deposited metal layer.

In the case where the light shielding layer is a reflector, the reflector preferably includes a metal layer. Furthermore, the reflector may have a specular reflection surface. Alternatively, the reflector may have a light scattering surface.

Alternatively, according to still another aspect of the present invention, provided is a display according to any of the above aspects, wherein the light shielding layer has a colored pattern that is formed by laser beam drawing on a layer containing a thermosensitive coloring agent, or has a black pattern that is formed due to carbonization by laser engraving.

The light shielding layer may be a light absorber.

According to still another aspect of the present invention, the display according to any of the aspects is provided in a part of a card.

The display can be provided in a booklet data page.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment of the Present Invention

Figure 1:
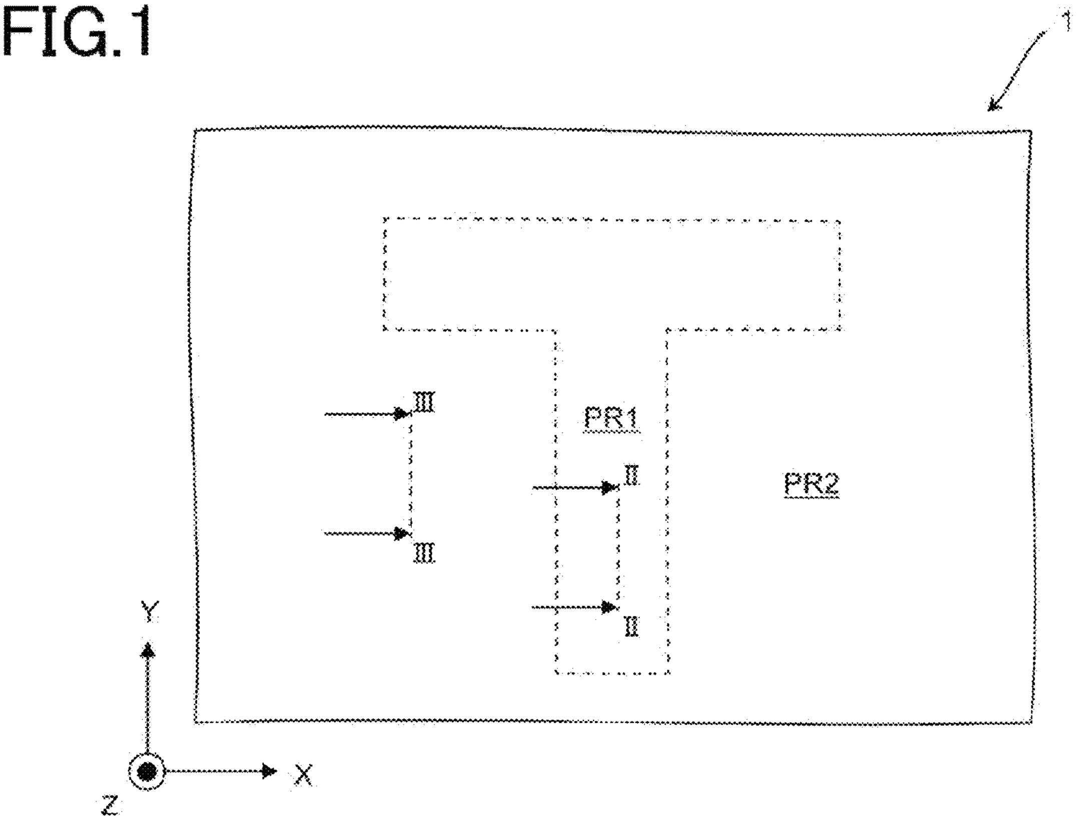
FIG. 1 is a schematic plan view of a display according to a first embodiment of the present invention.
Figure 2:
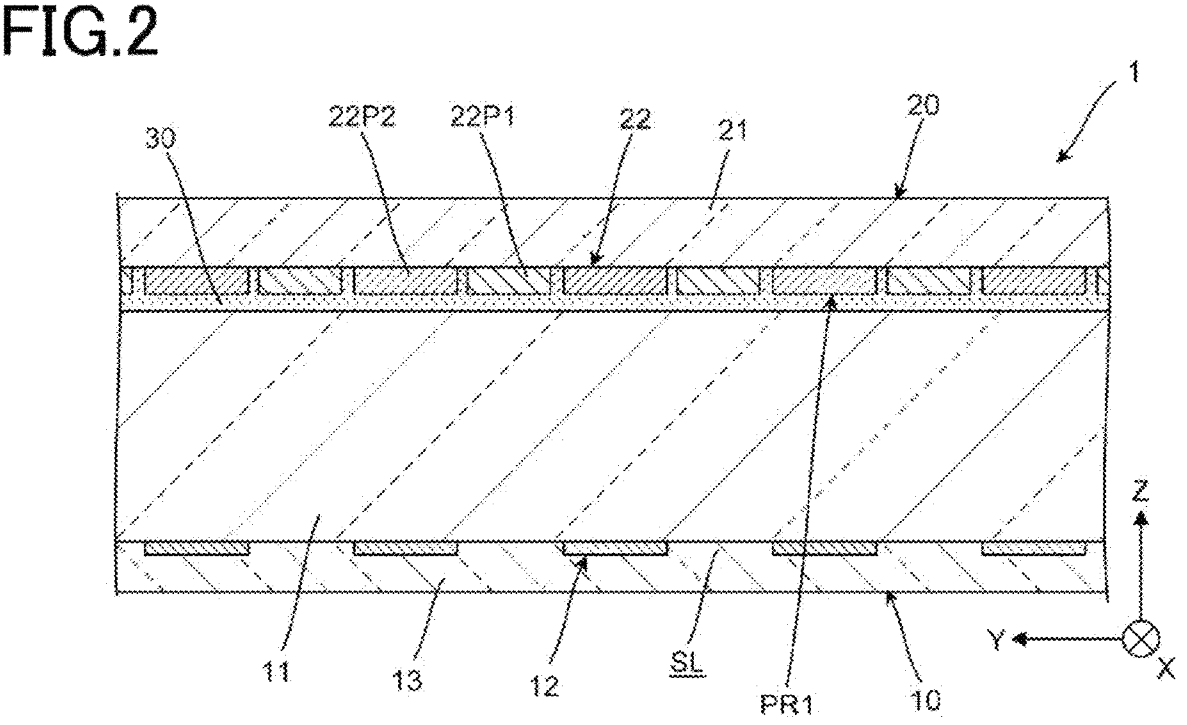
FIG. 2 is a cross-sectional view taken along the line II-II of the display shown in FIG. 1.
Figure 3:
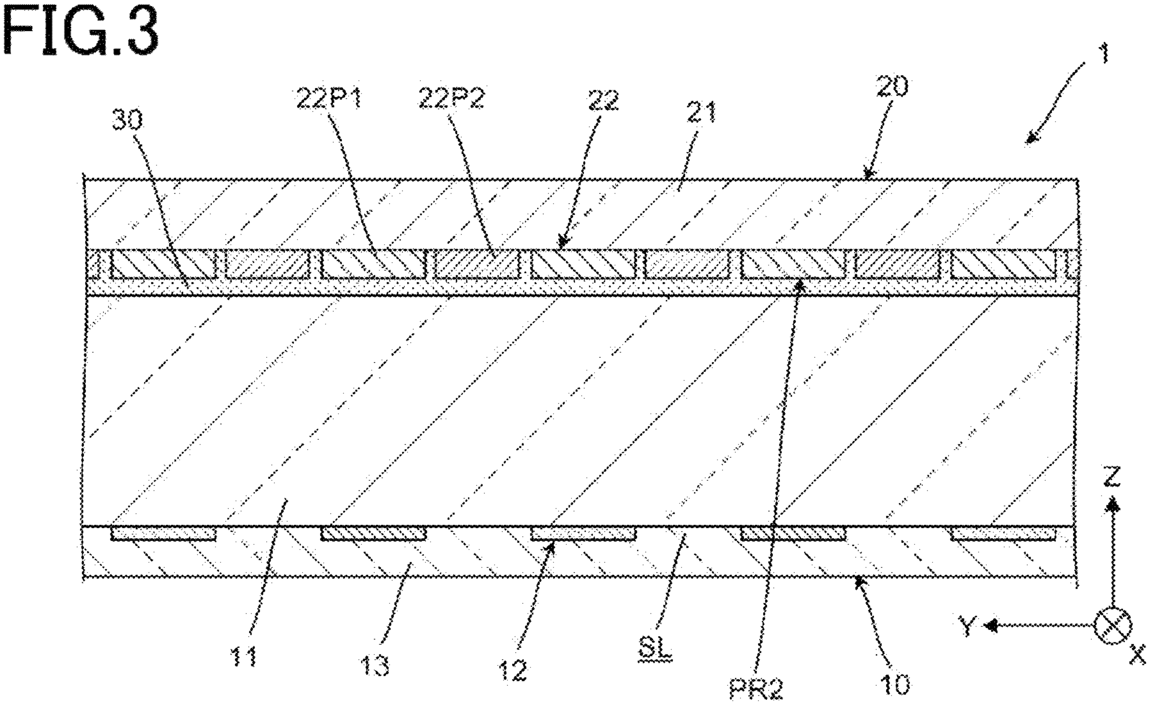
FIG. 3 is a cross-sectional view taken along the line III-III of the display shown in FIG. 1.
Figure 4:
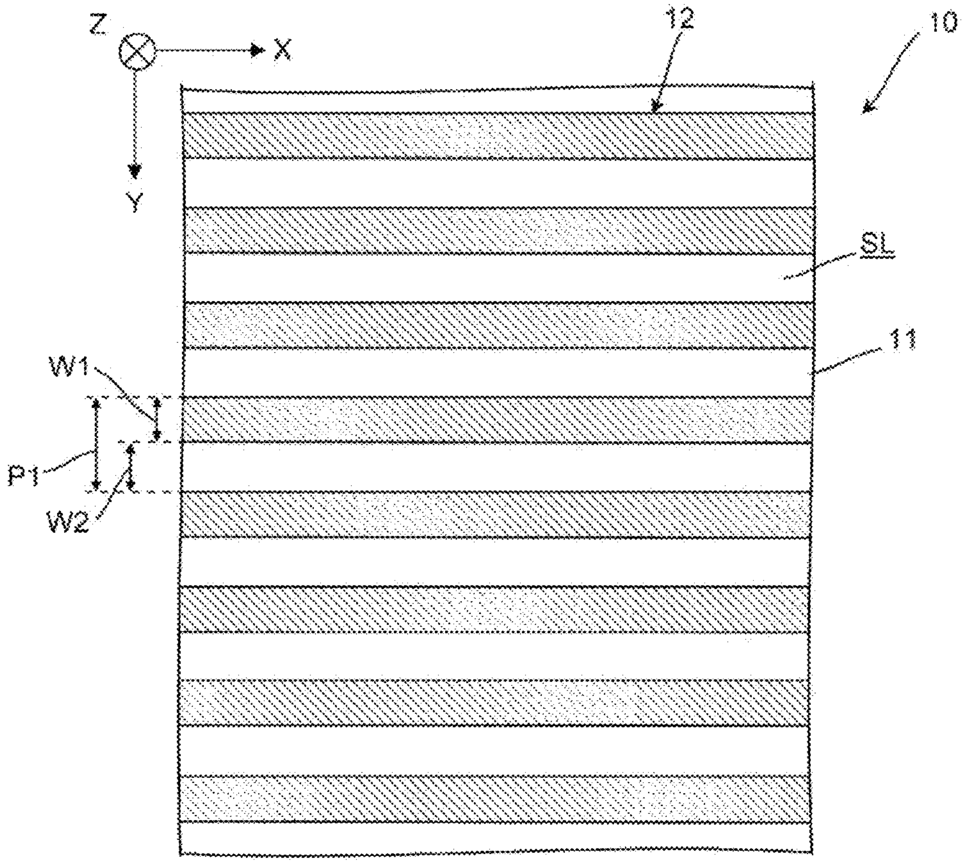
FIG. 4 is a schematic plan view of a mask layer of the display shown in FIGS. 1 to 3.
Figure 5:
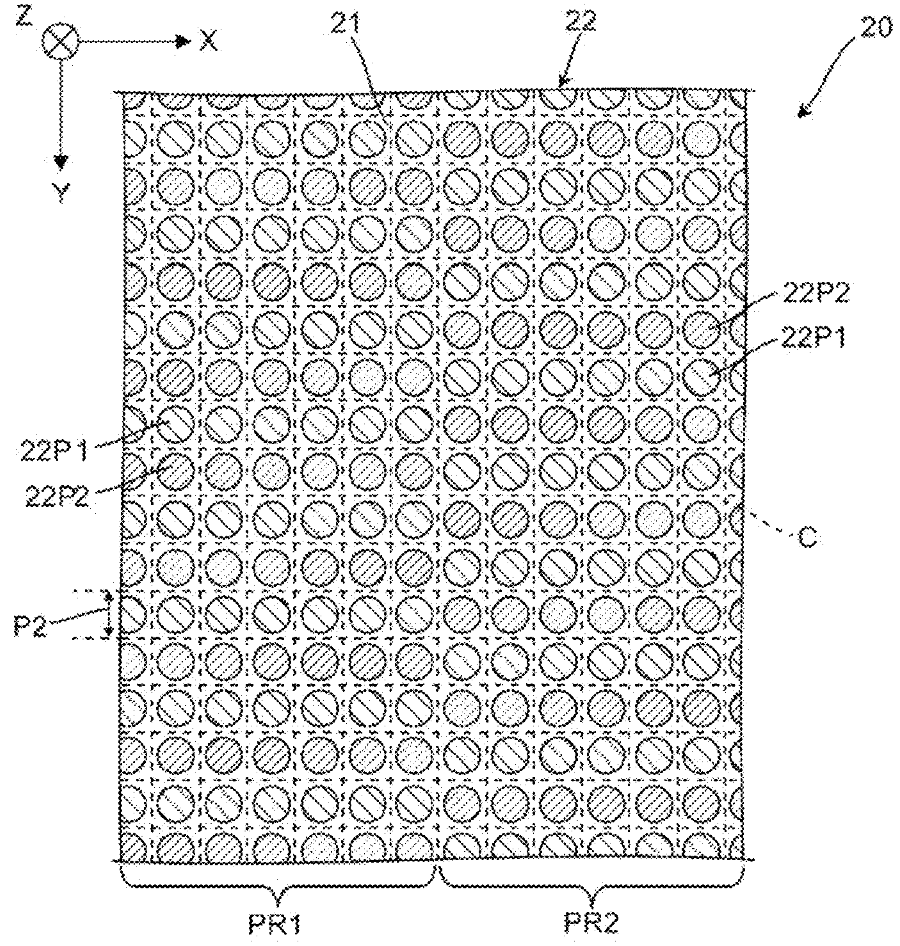
FIG. 5 is a schematic plan view of an image carrier of the display shown in FIGS. 1 to 3.

FIG. 1 is a schematic plan view of a display according to a first embodiment of the present invention. FIG. 2 is a cross-sectional view taken along the line II-II of the display shown in FIG. 1. FIG. 3 is a cross-sectional view taken along line the III-III of the display shown in FIG. 1. FIG. 4 is a schematic plan view of a mask layer of the display shown in FIGS. 1 to 3. FIG. 5 is a schematic plan view of an image carrier of the display shown in FIGS. 1 to 3.

In the drawings, the X direction is a direction parallel to a major surface of a light shielding layer (described later), that is, a direction parallel to a display surface of the display. The Y direction is a direction parallel to the major surface and perpendicular to the X direction, that is, a direction parallel to the display surface and perpendicular to the X direction. The Z direction is a direction perpendicular to the X direction and the Y direction, that is, a thickness direction of the display.

A display 1 shown in FIGS. 1 to 3 includes a mask layer 10, an image carrier 20, and an adhesive layer 30 as shown in FIGS. 2 and 3.

As shown in FIGS. 2 to 4, the mask layer 10 includes a transparent substrate 11, a light shielding layer 12, and a protective layer 13.

The transparent substrate 11 transmits part or all of light in the visible region. The transparent substrate 11 is preferably colorless and transparent.

The transparent substrate 11 may be a soft substrate such as a sheet or a film, or a hard substrate such as a card. The transparent substrate 11 may be a single layer or a multilayer.

The material of the transparent substrate 11 may be an inorganic material such as glass, or a polymer. The polymer may be a thermoplastic polymer or a curable compound.

The thermoplastic polymer may be, for example, polycarbonate, acrylic polymer, fluorine acrylic polymer, silicone, epoxy acrylate, polypropylene, polyethylene, polyester, polystyrene, cycloolefin polymer, methyl styrene polymer, fluorene polymer, polyethylene terephthalate (PET), polyacetal, or acrylonitrile-styrene copolymer.

The curable compound may be, for example, a phenol resin, a melamine resin, a urea resin, or an alkyd resin.

As shown in FIGS. 2 to 4, the light shielding layer 12 is provided on a first major surface of the transparent substrate 11. The light shielding layer 12 has a plurality of slits SL that are arranged at intervals in the width direction of the slits. That is, the slits are arranged in a stripe pattern. Furthermore, the slits form a lattice. In this case, the X direction is the length direction of the slits SL, and the Y direction is the width direction of the slits. In other words, the X-axis is parallel to the length direction of the slits SL, and the Y-axis is parallel to the width direction of the slits SL. That is, the X direction and the Y direction are perpendicular to each other. The X-axis and the Y-axis are perpendicular to each other, and form a Cartesian coordinate system. Light is transmitted through portions of the mask layer 10 at which the slits SL are located, and no light is transmitted through the other portions of the mask layer 10.

The slits SL extending in the length direction each have a constant width W2. Furthermore, adjacent slits SL have the same width W2. The slits SL are arranged at a constant pitch P1 in the width direction of the slits SL. In FIG. 4, a width W1 is the width of a portion of the light shielding layer 12 located between adjacent slits SL. In this case, for example, the width W1 is equal to the width W2.

A specific example of the light shielding layer 12 is a light shielding reflector. Another specific example of the light shielding layer 12 is a light absorber. The light shielding layer 12 may be formed by laminating a light shielding reflector and a light absorber or by alternately arranging a light shielding reflector and a light absorber.

The light shielding reflector can be obtained by forming a metal layer by vacuum deposition and forming slits SL in the metal layer. The material of the metal layer may be, for example, aluminum, chromium, nickel, iron, titanium, silver, gold, or copper, or an alloy thereof. The metal layer may have a metal oxide layer as a surface layer. The vacuum deposition may be vapor deposition or sputtering. The slits SL can be formed by etching. The etching may be chemical etching or laser etching. The chemical etching may be a process of dissolving the metal with an acid or an alkali while a portion of the metal layer not to be etched is masked with a resist to prevent it from being etched. The laser etching is also referred to as laser engraving. The laser etching may be a process of removing a portion of the metal layer irradiated with a laser beam.

The light absorber can be formed by partial thermal transfer of an ink ribbon, inkjet printing, laser engraving, electrophotography, offset printing, screen printing, or a combination of two or more of these methods. The printing for the light absorber may be performed using carbon black ink.

The light absorber can be formed by laser engraving. The light absorber can also be formed by drawing with a laser beam on a layer containing a thermosensitive coloring agent. The protective layer 13 may be a layer containing a thermosensitive coloring agent. That is, the light absorber may be a light absorber drawn with a laser beam. The light absorber obtained in this manner has a colored pattern formed by laser beam drawing. The light absorber may be a colored light absorber. That is, the light absorber may be a colored pattern. Alternatively, the light absorber may have a carbonized pattern formed due to carbonization by laser engraving. The light absorber may be a carbonized light absorber. That is, the light absorber may be a carbonized pattern. The carbonized pattern can be formed in the protective layer 13. Such a light absorber drawn with a laser beam can form an individual pattern. The material of the light absorber drawn with a laser beam is irreversibly altered; thus, the light absorber cannot be erased. This makes falsification of the display difficult.

In this case, for example, the light shielding layer 12 is a light shielding reflector made of metal and having the slits SL.

The protective layer 13 is provided on the transparent substrate 11 and the light shielding layer 12. The protective layer 13 protects the light shielding layer 12 from damage. The protective layer 13 can also serve as a substrate of the light shielding layer 12. In the case where the light shielding layer 12 is provided on the transparent substrate 11, the protective layer 13 may be omitted.

The protective layer 13 is transparent to light in the visible region. The protective layer 13 is preferably colorless and transparent.

The protective layer 13 may be a sheet or a film. The protective layer 13 may be, for example, a polymer sheet or a polymer film. The protective layer 13 is a single layer or a multilayer. The protective layer 13 as a multilayer may have a hard coat layer on the transparent substrate side and have an antifouling layer as a surface layer. The antifouling layer may have antimicrobial properties.

The material of the protective layer 13 may be a thermoplastic polymer or a curable compound.

The thermoplastic polymer may be, for example, polycarbonate, acrylic polymer, fluorine acrylic polymer, silicone, epoxy acrylate, polystyrene, cycloolefin polymer, polypropylene, polyethylene, polyester, methyl styrene polymer, fluorene polymer, polyethylene terephthalate (PET), or acrylonitrile-styrene copolymer.

The curable compound may be, for example, a phenol resin, melamine, a urea resin, an alkyd resin, or polyacetal.

As shown in FIGS. 2 and 3, the image carrier 20 faces the light shielding layer 12 via the transparent substrate 11. As shown in FIGS. 2, 3 and 5, the image carrier 20 includes a protective layer 21 and an image recording layer 22.

The protective layer 21 protects the image recording layer 22 from damage. The protective layer 21 can also serve as a substrate of the image recording layer 22. For example, in the case where the image recording layer 22 is provided on the transparent substrate 11, the protective layer 21 may be omitted.

The protective layer 21 is transparent to light in the visible region. The protective layer 21 is preferably colorless and transparent.

The protective layer 21 may be a sheet or a film. The protective layer 21 may be, for example, a polymer sheet or a polymer film. The protective layer 21 may have a single-layer structure or a multilayer structure. The material of the protective layer 21 may be any of the materials described as examples of the material of the protective layer 13.

The image recording layer 22 is provided between the transparent substrate 11 and the protective layer 21. The image recording layer 22 faces the light shielding layer 12 via the transparent substrate 11. The arrangement of the image recording layer 22 is suitable for maintaining a distance from the light shielding layer 12 to the image recording layer 22.

The image recording layer 22 includes colored portions 22P1 and 22P2. The colored portions 22P1 and 22P2 each have a higher transmittance in a wavelength range in the visible region, and have a lower transmittance in other wavelength ranges in the visible region. The colored portions 22P1 and 22P2 have different transmission spectra in the visible region. Thus, when the display 1 is illuminated with white light and the transmitted light is observed, the colored portions 22P1 and 22P2 appear in different colors.

The image recording layer 22 including the colored portions 22P1 and 22P2 can be formed by partial thermal transfer of an ink ribbon, inkjet printing, electrophotography, or a combination of two or more of these methods. The image recording layer 22 may be composed of three colors: cyan, magenta, and yellow. The image recording layer 22 may be composed of four colors including black. The image recording layer 22 may be composed of five or more and ten or less colors including one or more spot colors. The image recording layer 22 may be formed by offset printing or screen printing. The colored portions 22P1 and 22P2 of the image recording layer 22 obtained in this manner contain one or both of a dye and a pigment. The dye or pigment may be a visible ink. The colored portions 22P1 and 22P2 may contain a functional ink. The functional ink may be one or both of a pearl ink and a magnetic ink. The colored portions 22P1 and 22P2 may further contain other components such as a binder resin.

The image carrier 20 has a first display region PR1 and a second display region PR2 shown in FIGS. 1 to 3 and 5. The first display region PR1 may be surrounded by the second display region PR2. The outer shape of the first display region PR1 may represent a symbol, an icon, a flag, an emblem, a mark, a code, a character, a number, a text, a facial image, a portrait, an animal, a plant, a legendary creature, or a landmark. The second display region PR2 may be a background. The facial image may be a facial image of the owner of the display. The character, number, and text may represent the name or date of birth of the owner of the display, or a number unique to the display. The code may be a code unique to the display. As shown in FIG. 5, the first display region PR1 and the second display region PR2 each include a plurality of cells C. The cells C are arranged in the length direction and the width direction of the slits SL. Specifically, the cells C are located at lattice points of a two-dimensional lattice defined by a basis composed of a vector parallel to the length direction of the slits SL and a vector parallel to the width direction of the slits SL that are perpendicular to each other. The two-dimensional lattice is a square lattice or a rectangular lattice. In this case, for example, a pitch P2 of the cells C arranged in the width direction of the slits SL is ½ of the pitch P1 of the slits SL.

The colored portions 22P1 and 22P2 are arranged in the respective cells C. That is, the colored portions 22P1 and 22P2 are located at the respective lattice points of the virtual two-dimensional lattice.

More specifically, in the first display region PR1, the colored portions 22P1 are not located in the cells C in the (2n−1)th row (n is a natural number) of the rows each of which is composed of the cells C arranged in the X direction. In the first display region PR1, the colored portions 22P1 are located in the respective cells C in the (2n)th row of the rows each of which is composed of the cells C arranged in the X direction.

On the other hand, in the second display region PR2, the colored portions 22P1 are not located in the cells C in the (2n)th row of the rows each of which is composed of the cells C arranged in the X direction. In the second display region PR2, the colored portions 22P1 are located in the respective cells C in the (2n−1)th row of the rows each of which is composed of the cells C arranged in the X direction.

Furthermore, in the first display region PR1, the colored portions 22P2 are not located in the cells C in the (2n)th row of the rows each of which is composed of the cells C arranged in the X direction. In the first display region PR1, the colored portions 22P2 are located in the respective cells C in the (2n−1)th row of the rows each of which is composed of the cells C arranged in the X direction.

On the other hand, in the second display region PR2, the colored portions 22P2 are not located in the cells C in the (2n−1)th row of the rows each of which is composed of the cells C arranged in the X direction. In the second display region PR2, the colored portions 22P2 are located in the respective cells C in the (2n)th row of the rows each of which is composed of the cells C arranged in the X direction.

Thus, the rows of the cells C in which the colored portions 22P1 are located in the first display region PR1 are offset by the pitch P2 in the Y direction from the rows of the cells C in which the colored portions 22P1 are located in the second display region PR2, and the rows of the cells C in which the colored portions 22P2 are located in the first display region PR1 are offset by the pitch P2 in the Y direction from the rows of the cells C in which the colored portions 22P2 are located in the second display region PR2.

When an observer observes only the image carrier 20 with the naked eye, the observer cannot recognize the offset and thus cannot distinguish the first display region PR1 and the second display region PR2 from each other. As described later, when an observer observes the display 1 including a combination of the mask layer 10 and the image carrier 20 with the naked eye, the observer can distinguish the first display region PR1 and the second display region PR2 from each other. That is, the colored portions 22P1 and 22P2 arranged in the first display region PR1 and the colored portions 22P1 and 22P2 arranged in the second display region PR2 constitute a latent image rendered visible by being partially concealed by the light shielding layer 12.

As shown in FIGS. 2 and 3, the adhesive layer 30 is interposed between the mask layer 10 and the image carrier 20. The mask layer 10 and the image carrier 20 are bonded to each other by the adhesive layer 30 so that the light shielding layer 12 and the image recording layer 22 face each other via the transparent substrate 11. The adhesive layer 30 is transparent to light in the visible region. The adhesive layer 30 is preferably colorless and transparent. The adhesive layer 30 may be a single layer made of an adhesive, or may be a multilayer including a layer made of an adhesive and a layer made of an anchoring agent.

The display 1 can display different images according to the observation condition as described below.

Figure 6:
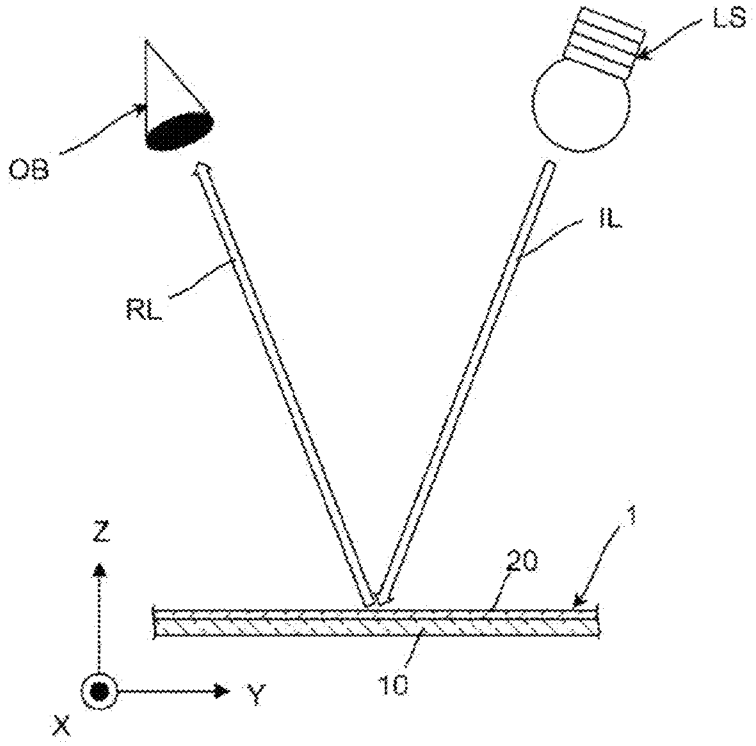
FIG. 6 is a schematic diagram showing an example of an observation condition.
Figure 7:
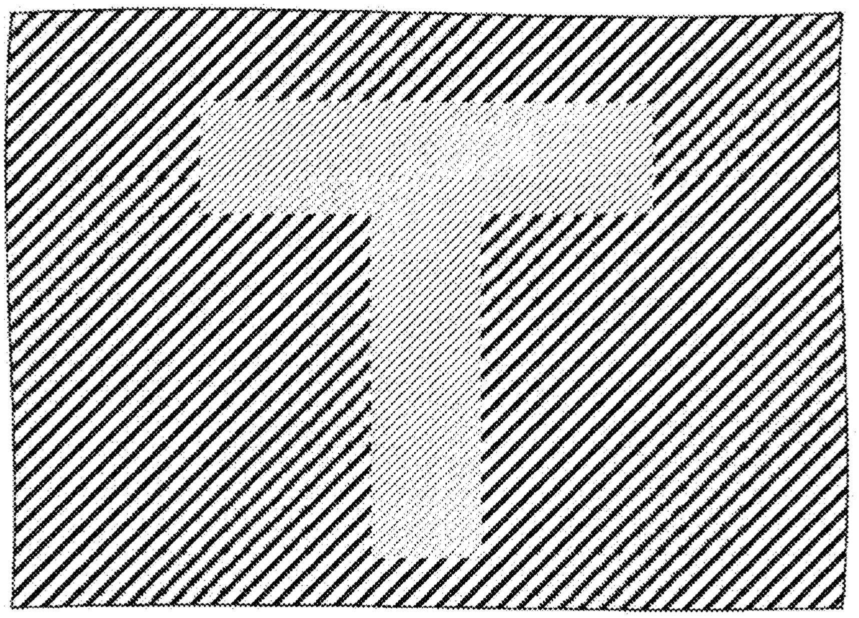
FIG. 7 is a diagram showing an example of an image displayed by the display shown in FIGS. 1 to 3 under the observation condition in FIG. 6.

FIG. 6 is a schematic diagram showing an example of the observation condition. FIG. 7 is a diagram showing an example of an image displayed by the display shown in FIGS. 1 to 3 under the observation condition in FIG. 6.

In the observation condition shown in FIG. 6, the display 1 is placed on a black surface (not shown) so that the mask layer 10 is located between the black surface and the image carrier 20. In this state, the image carrier 20 of the display 1 is illuminated with illumination light IL which is white light emitted from a light source LS. An observer OB visually recognizes reflected light RL emerging from the display 1. In this case, the incident angle of the illumination light IL on the display 1 is adjusted to be a first incident angle. Furthermore, in this case, the light shielding layer has a specular reflection surface by which the illumination light IL is specularly reflected, and the observer OB visually recognizes specular reflection light as the reflected light RL.

As described above, the rows of the cells C in which the colored portions 22P1 are located in the first display region PR1 are offset by the pitch P2 in the Y direction from the rows of the cells C in which the colored portions 22P1 are located in the second display region PR2, and the rows of the cells C in which the colored portions 22P2 are located in the first display region PR1 are offset by the pitch P2 in the Y direction from the rows of the cells C in which the colored portions 22P2 are located in the second display region PR2. That is, as shown in FIGS. 2 and 3, the positions of the colored portions 22P1 relative to the slits SL in the first display region PR1 of the display 1 are offset by the pitch P2 in the Y direction from the positions of the colored portions 22P1 relative to the slits SL in the second display region PR2 of the display 1. Similarly, the positions of the colored portions 22P2 relative to the slits SL in the first display region PR1 of the display 1 are offset by the pitch P2 in the Y direction from the positions of the colored portions 22P2 relative to the slits SL in the second display region PR2 of the display 1.

Thus, under the observation condition shown in FIG. 6, for example, part of the illumination light IL incident on the first display region PR1 is transmitted through the colored portions 22P1 and reflected by the light shielding layer 12. The reflected light RL reflected by the light shielding layer 12 is then transmitted through neighboring colored portions 22P1 adjacent to the original colored portions 22P1, and can be visually recognized by the observer OB. The remaining part of the illumination light IL incident on the first display region PR1 is transmitted through the colored portions 22P2, and then passes through the slits SL and is absorbed by the black surface.

On the other hand, part of the illumination light IL incident on the second display region PR2 is transmitted through the colored portions 22P2 and reflected by the light shielding layer 12. The reflected light RL reflected by the light shielding layer 12 is then transmitted through neighboring colored portions 22P2 adjacent to the original colored portions 22P2, and is visually recognized by the observer OB. The remaining part of the illumination light IL incident on the second display region PR2 is transmitted through the colored portions 22P1, and then passes through the slits SL and is absorbed by the black surface.

Thus, the reflected light RL from the first display region PR1 of the display 1 is colored by the colored portions 22P1. On the other hand, the reflected light RL from the second display region PR2 of the display 1 is colored by the colored portions 22P2. Therefore, as shown in FIG. 7, these regions appear in different colors. Thus, the latent image is rendered visible.

Figure 8:
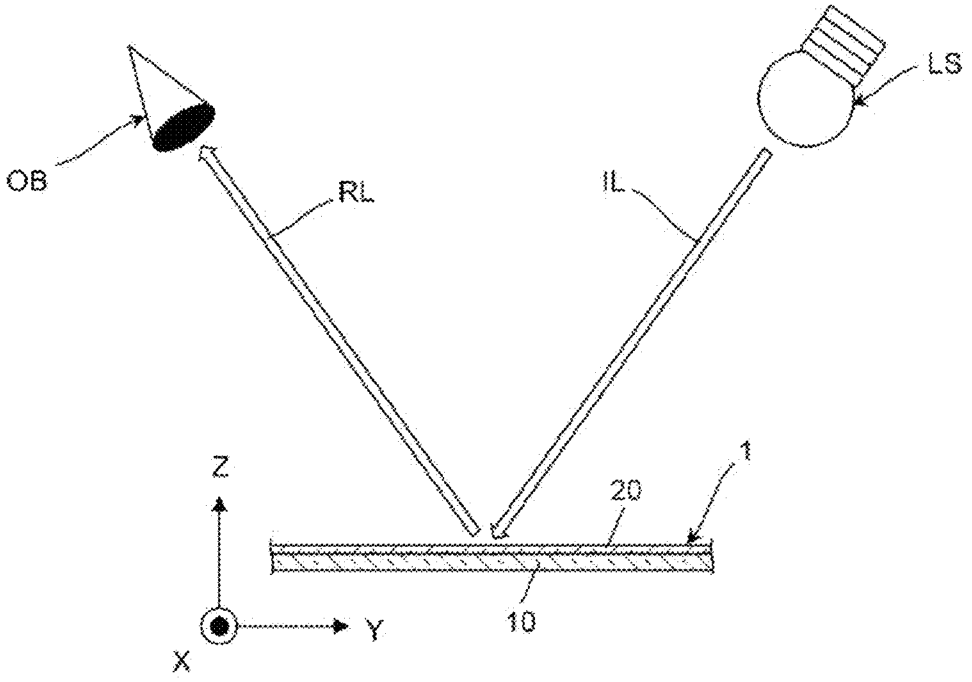
FIG. 8 is a schematic diagram showing another example of the observation condition.
Figure 9:
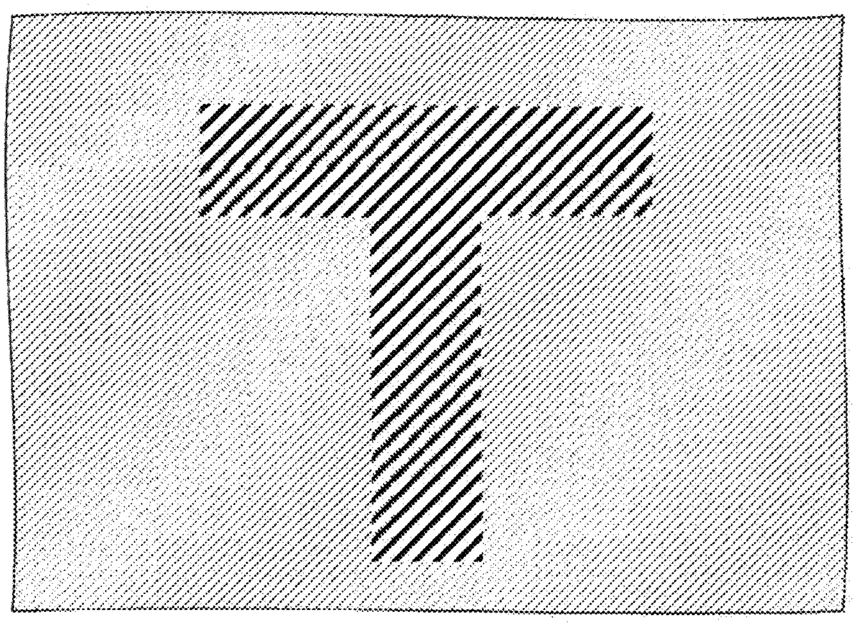
FIG. 9 is a diagram showing an example of an image displayed by the display shown in FIGS. 1 to 3 under the observation condition in FIG. 8.

FIG. 8 is a schematic diagram showing another example of the observation condition. FIG. 9 is a diagram showing an example of an image displayed by the display shown in FIGS. 1 to 3 under the observation condition in FIG. 8.

The observation condition shown in FIG. 8 is the same as the observation condition shown in FIG. 6 except that the incident angle of the illumination light IL is changed from the first incident angle to a second incident angle and that the observation direction by the observer OB is changed accordingly.

Under the observation condition shown in FIG. 8, part of the illumination light IL incident on the first display region PR1 is transmitted through the colored portions 22P2 and reflected by the light shielding layer 12. The reflected light RL reflected by the light shielding layer 12 is then transmitted through neighboring colored portions 22P2 adjacent to the original colored portions 22P2, and can be visually recognized by the observer OB. The remaining part of the illumination light IL incident on the first display region PR1 is transmitted through the colored portions 22P1, and then passes through the slits SL and is absorbed by the black surface.

On the other hand, part of the illumination light IL incident on the second display region PR2 is transmitted through the colored portions 22P1 and reflected by the light shielding layer 12. The reflected light RL reflected by the light shielding layer 12 is then transmitted through neighboring colored portions 22P1 adjacent to the original colored portions 22P1, and is visually recognized by the observer OB. The remaining part of the illumination light IL incident on the second display region PR2 is transmitted through the colored portions 22P2, and then passes through the slits SL and is absorbed by the black surface.

Thus, the reflected light RL from the portion of the display 1 corresponding to the first display region PR1 is colored by the colored portions 22P2. On the other hand, the reflected light RL from the portion of the display 1 corresponding to the second display region PR2 is colored by the colored portions 22P1. Therefore, as shown in FIG. 9, these regions appear in different colors. Thus, the latent image is rendered visible. As shown in FIGS. 7 and 9, the colors of the visible image that can be observed under the observation condition shown in FIG. 8 and the colors of the visible image that can be observed under the observation condition shown in FIG. 6 are inverted.

Thus, in the display 1, the latent image is rendered visible under the observation conditions shown in FIGS. 6 and 8. In the display 1, the colors of the visible image are changed according to the change in the observation condition as shown in FIGS. 6 and 8.

Figure 10:
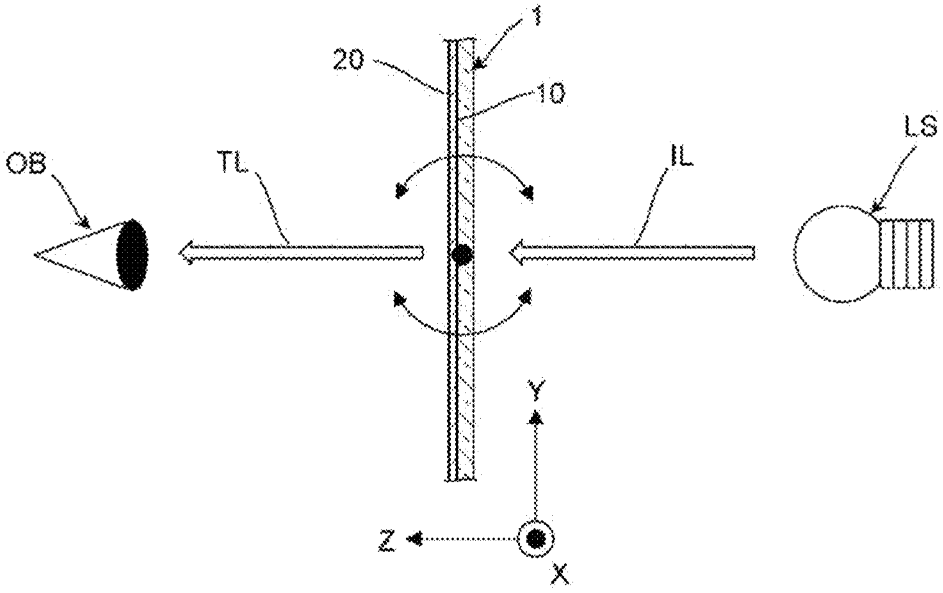
FIG. 10 is a schematic diagram showing still another example of the observation condition.

FIG. 10 is a schematic diagram showing still another example of the observation condition.

In the observation condition shown in FIG. 10, the mask layer 10 of the display 1 is illuminated with the illumination light IL which is white light emitted from the light source LS. The observer OB observes transmitted light TL.

The illumination light IL is transmitted through the portions of the light shielding layer 12 at which the slits SL are located, and is blocked by the other portions of the light shielding layer 12. In the portion of the display 1 corresponding to the first display region PR1, the illumination light IL transmitted through the slits SL is, for example, transmitted through the colored portions 22P1, and then can be visually recognized as the transmitted light TL by the observer OB. In this case, in the portion of the display 1 corresponding to the second display region PR2, the illumination light IL transmitted through the slits SL is transmitted through the colored portions 22P2, and then can be visually recognized as the transmitted light TL by the observer OB. Thus, in this case, the latent image is rendered visible as shown in FIG. 7.

When the display 1 is slightly rotated about an axis parallel to the X direction, in the portion of the display 1 corresponding to the first display region PR1, the positions at which the illumination light IL transmitted through the slits SL is incident on the image recording layer 22 are changed from the positions of the colored portions 22P1 to the positions of the colored portions 22P2. In the portion of the display 1 corresponding to the second display region PR2, the positions at which the illumination light IL transmitted through the slits SL is incident on the image recording layer 22 are changed from the positions of the colored portions 22P2 to the positions of the colored portions 22P1. This causes the visible image displayed by the display 1 to be changed from the visible image shown in FIG. 7 to the visible image shown in FIG. 9.

Figure 11:
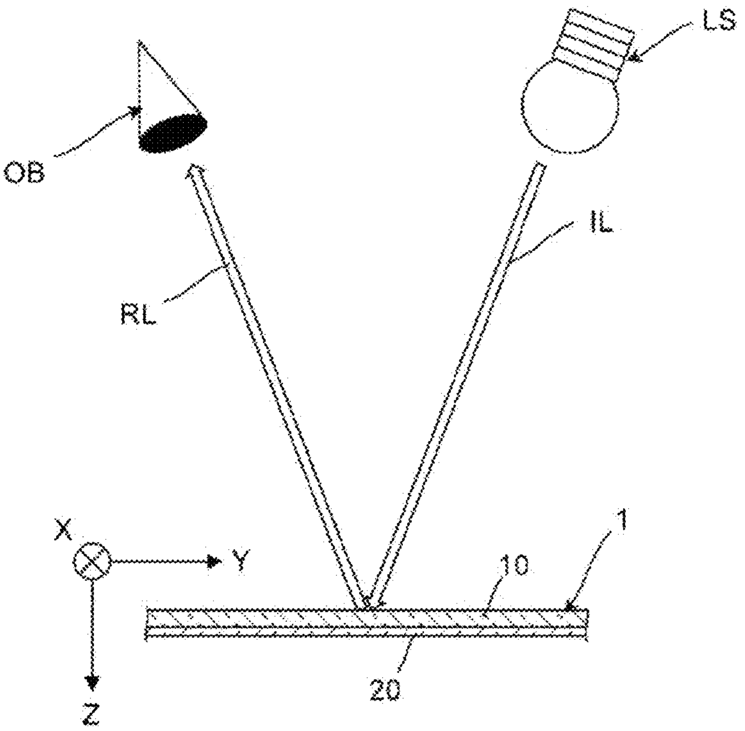
FIG. 11 is a schematic diagram showing still another example of the observation condition.

FIG. 11 is a schematic diagram showing still another example of the observation condition.

In the observation condition shown in FIG. 11, the display 1 is placed on a reflection surface (not shown) so that the image carrier 20 is located between the reflection surface and the mask layer 10. In this state, the mask layer 10 of the display 1 is illuminated with the illumination light IL which is white light emitted from the light source LS. An observer OB visually recognizes reflected light RL emerging from the display 1. In this case, the incident angle of the illumination light IL on the display 1 is adjusted to be a third incident angle. Furthermore, in this case, the observer OB visually recognizes specular reflection light as the reflected light RL. In this case, the reflection surface on which the display 1 is placed has the same reflection characteristics as the light shielding layer 12.

Figure 12:
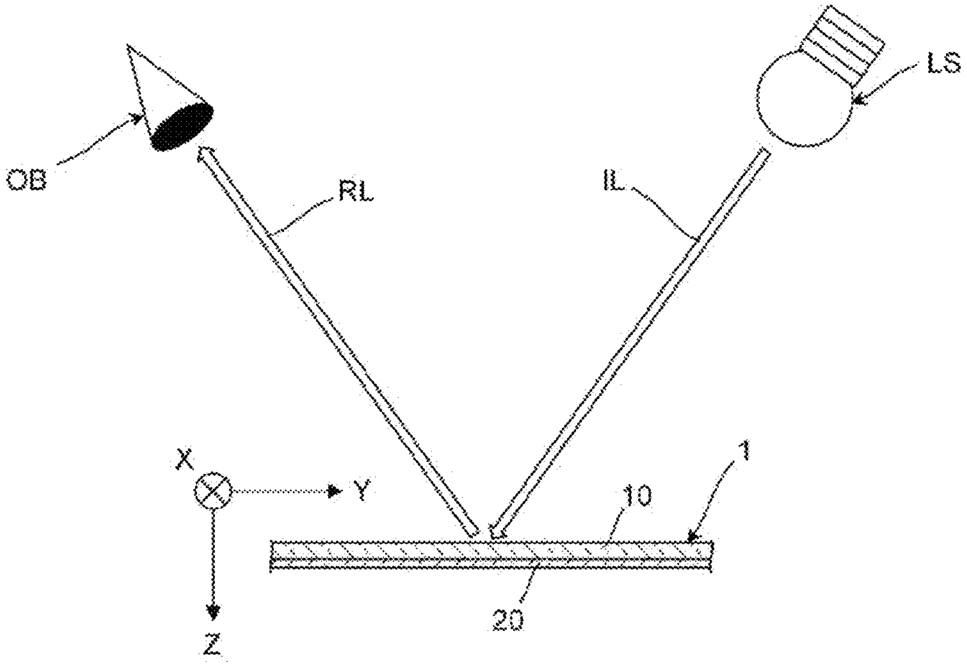
FIG. 12 is a schematic diagram showing still another example of the observation condition.

FIG. 12 is a schematic diagram showing still another example of the observation condition.

The observation condition shown in FIG. 12 is the same as the observation condition shown in FIG. 11 except that the incident angle of the illumination light IL is changed from the third incident angle to a fourth incident angle and that the observation direction by the observer OB is changed accordingly.

Under the observation conditions shown in FIGS. 11 and 12, the illumination light IL passing through the slits SL is reflected by the reflection surface on which the display 1 is placed. As described above, the reflection surface has the same reflection characteristics as the light shielding layer 12. Thus, the concealing effect of the light shielding layer 12 is not exhibited or is not prominently exhibited. Therefore, under both the observation conditions shown in FIGS. 11 and 12, the portion of the display 1 corresponding to the first display region PR1 and the portion of the display 1 corresponding to the second display region PR2 appear in the same color. That is, even when the incident angle of the illumination light IL is changed, the latent image is not rendered visible.

Thus, the display 1 can display images according to the observation condition. That is, the display 1 can display special images in which the image is changed according to the observation condition.

First Modification

The display 1 may be variously modified.

Figure 13:
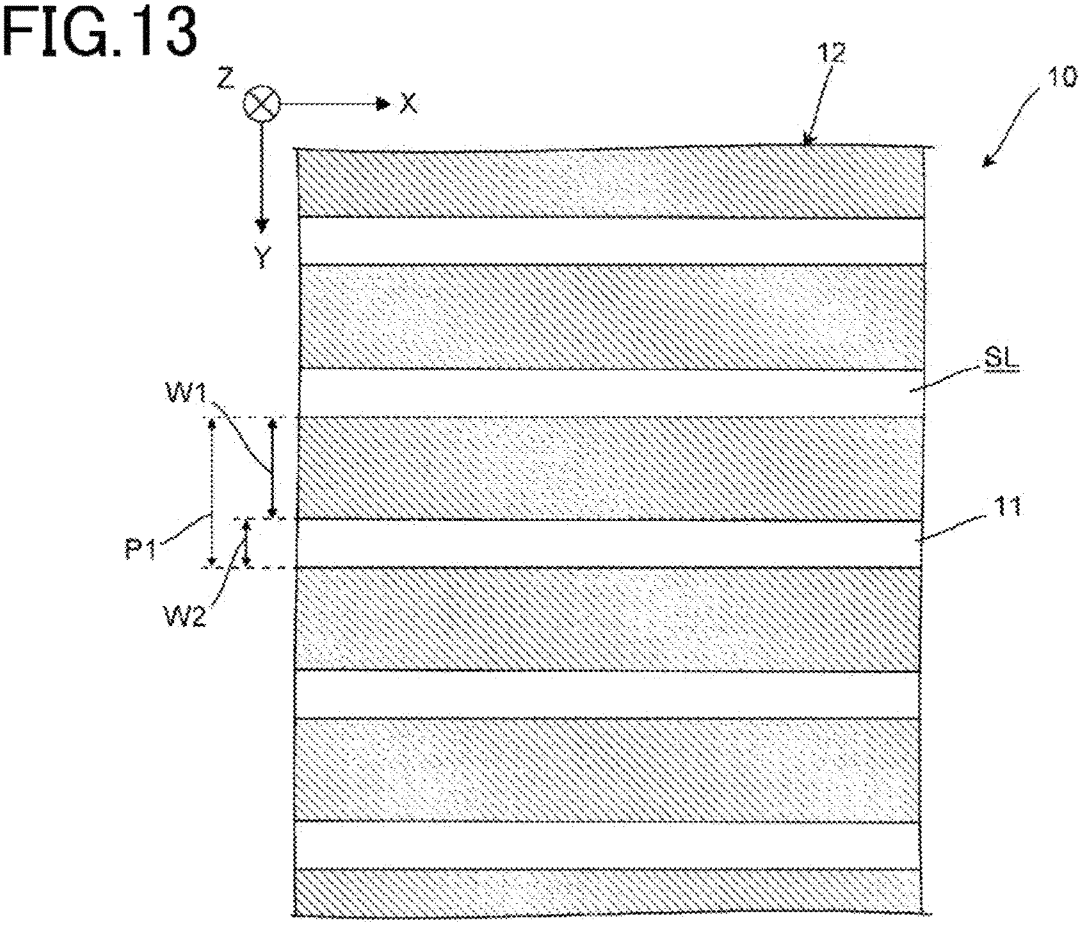
FIG. 13 is a schematic plan view of a mask layer of a display according to a modification.
Figure 14:
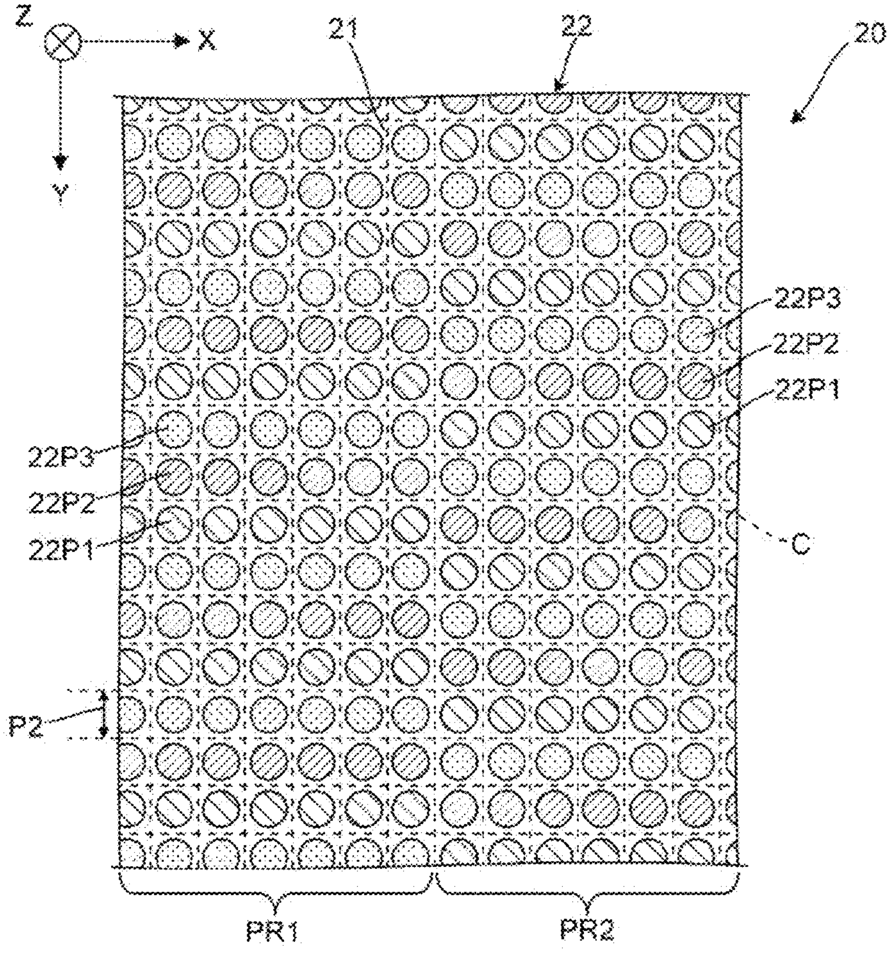
FIG. 14 is a schematic plan view of an image recording layer of the display according to the modification.
Figure 15:
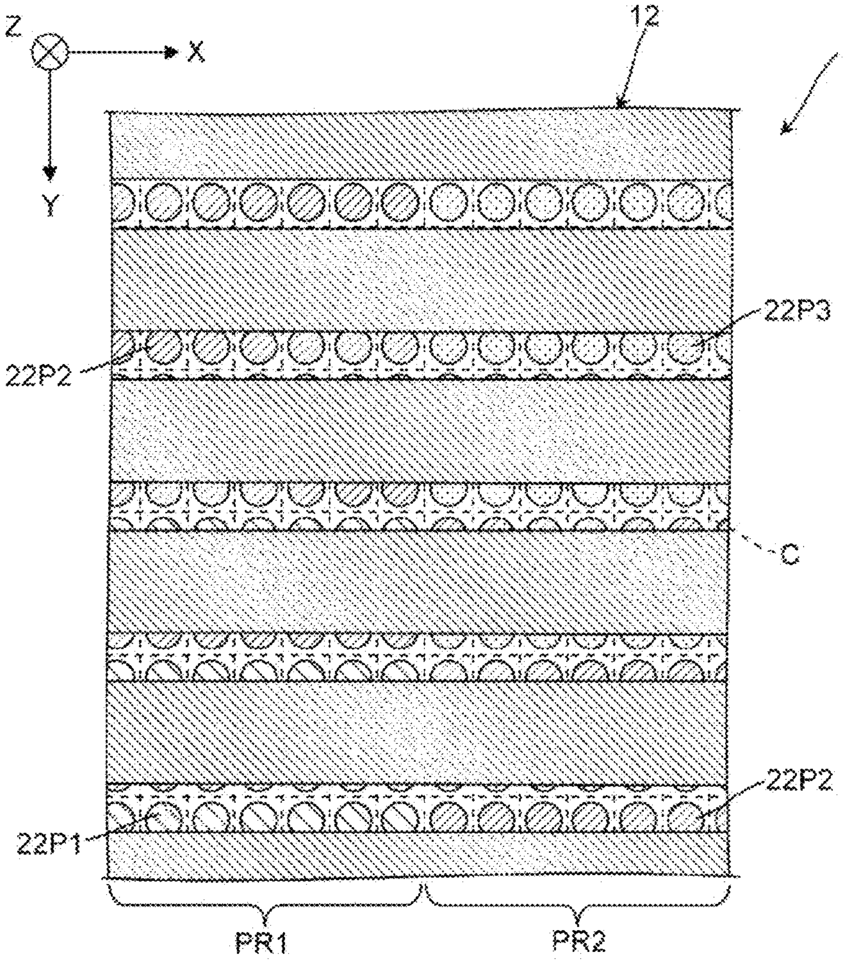
FIG. 15 is a schematic plan view of the display according to the modification.

FIG. 13 is a schematic plan view of a mask layer of a display according to a modification. FIG. 14 is a schematic plan view of an image recording layer of the display according to the modification. FIG. 15 is a schematic plan view of the display according to the modification.

In the mask layer 10 shown in FIG. 13, the width W1 is ⅔ of the pitch P1, and the width W2 is ⅓ of the pitch P1. Except for this point, the mask layer 10 shown in FIG. 13 is the same as the mask layer 10 described with reference to FIGS. 2 to 4 and the like.

The image carrier 20 shown in FIG. 14 is the same as the image carrier 20 described with reference to FIGS. 2, 3, 5, and the like, except for the following point.

That is, in the image carrier 20 shown in FIG. 14, the pitch P2 is changed from ⅓m of the pitch P1 (m is a natural number).

The image recording layer 22 further includes colored portions 22P3 in addition to the colored portions 22P1 and 22P2. The colored portions 22P3 have a higher transmittance in a wavelength range in the visible region, and have a lower transmittance in other wavelength ranges in the visible region. The colored portions 22P3 have a transmission spectrum in the visible region different from the transmission spectra in the visible region of the colored portions 22P1 or 22P2. Thus, when the display 1 is illuminated with white light and the transmitted light is observed, the colored portions 22P1 to 22P3 appear in different colors.

In the first display region PR1, of the rows each of which is composed of the cells C arranged in the X direction, the cells C in the (3n−1)th row (n is a natural number) are cells for the colored portions 22P1, the cells C in the (3n)th row are cells for the colored portions 22P2, and the cells C in the (3n+1)th row are cells for the colored portions 22P3. That is, in the first display region PR1, of the rows each of which is composed of the cells C arranged in the X direction, the colored portions 22P1 are not located in the cells C in the (3n)th row or in the (3n+1)th row, but are located in the cells C in the (3n−1)th row. In the first display region PR1, of the rows each of which is composed of the cells C arranged in the X direction, the colored portions 22P2 are not located in the cells C in the (3n−1)th row or in the (3n+1)th row, but are located in the cells C in the (3n)th row. Furthermore, in the first display region PR1, of the rows each of which is composed of the cells C arranged in the X direction, the colored portions 22P3 are not located in the cells C in the (3n−1)th row or in the (3n)th row, but are located in the cells C in the (3n+1)th row.

On the other hand, in the second display region PR2, of the rows each of which is composed of the cells C arranged in the X direction, the cells C in the (3n−2)th row are cells for the colored portions 22P1, the cells C in the (3n−1)th row are cells for the colored portions 22P2, and the cells C in the (3n)th row are cells for the colored portions 22P3. That is, in the second display region PR2, of the rows each of which is composed of the cells C arranged in the X direction, the colored portions 22P1 are not located in the cells C in the (3n−1)th row or in the (3n)th row, but are located in the cells C in the (3n−2)th row. In the second display region PR2, of the rows each of which is composed of the cells C arranged in the X direction, the colored portions 22P2 are not located in the cells C in the (3n−2)th row or in the (3n)th row, but are located in the cells C in the (3n−1)th row. Furthermore, in the second display region PR2, of the rows each of which is composed of the cells C arranged in the X direction, the colored portions 22P3 are not located in the cells C in the (3n−2)th row or in the (3n−1)th row, but are located in the cells C in the (3n)th row.

In the display 1, the pitch P1 of the slits SL is changed from 3m times the pitch P2 of the cells C arranged in the Y direction. Thus, in each of the first display region PR1 and the second display region PR2, the positions of the colored portions 22P1 to 22P3 relative to the slits SL are changed in the arrangement direction of the slits SL. Therefore, in the case where this structure is adopted, in each of the portion of the visible image displayed by the display 1 corresponding to the first display region PR1 and the portion of the visible image displayed by the display 1 corresponding to the second display region PR2, the colors are changed in the arrangement direction of the slits SL. That is, in the case where the above structure is adopted, due to the difference between the pitch P1 of the slits SL and the pitch P2 of the cells C, rainbow stripes appear in each of the portion of the visible image displayed by the display 1 corresponding to the first display region PR1 and the portion of the visible image displayed by the display 1 corresponding to the second display region PR2. The display of rainbow stripes is a special image display in which the image is changed according to the observation condition.

The pitch P1 of the slits SL and the pitch P2 of the cells C in the arrangement direction of the slits SL preferably satisfy the relationship represented by the following inequality (1) or (2).

$$0\% < (P1 - 3 \times P2)/(3 \times P2) < 25\% \quad (1)$$

$$0\% < (3 \times P2 - P1)/(3 \times P2) < 25\% \quad (2)$$

When the offset amount of the pitch P1 from 3 times the pitch P2 is increased, the period of the stripes of the rainbow stripes is reduced. This makes it difficult to distinguish the portion of the visible image corresponding to the first display region PR1 and the portion of the visible image corresponding to the second display region PR2 from each other under the condition in which the visible image is to be displayed.

Second Embodiment of the Present Invention

Figure 16:
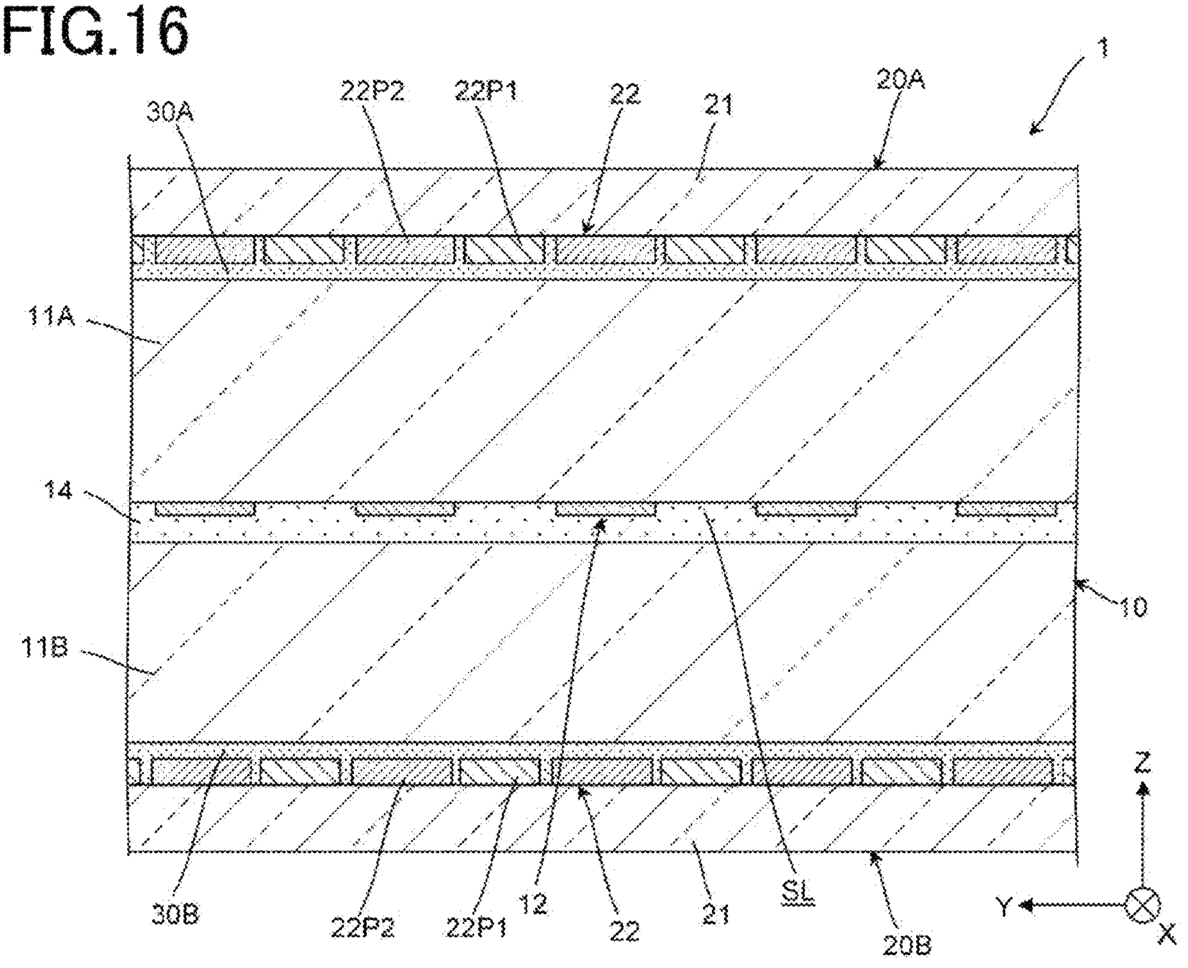
FIG. 16 is a schematic cross-sectional view of a display according to a second embodiment of the present invention.

FIG. 16 is a schematic cross-sectional view of a display according to a second embodiment of the present invention.

The display 1 shown in FIG. 16 includes the mask layer 10, a first image carrier 20A, a second image carrier 20B, a first adhesive layer 30A, and a second adhesive layer 30B.

The mask layer 10 incudes a first transparent substrate 11A, a second transparent substrate 11B, the light shielding layer 12, and an adhesive layer 14.

The first transparent substrate 11A transmits light in the entire or part of the visible region. The first transparent substrate 11A is preferably colorless and transparent. The material of the first transparent substrate 11A may be, for example, any of the materials described as examples of the material of the transparent substrate 11.

The light shielding layer 12 is provided on a first major surface of the first transparent substrate 11A. The light shielding layer 12 of the second embodiment is the same as the light shielding layer 12 described in the first embodiment. In this case, the light shielding layer 12 as a specific example is a light shielding reflector made of metal and having the slits SL.

The second transparent substrate 11B faces the first transparent substrate 11A via the light shielding layer 12 and the adhesive layer 14. The second transparent substrate 11B transmits light in the entire or part of the visible region. The second transparent substrate 11B is preferably colorless and transparent. The material of the second transparent substrate 11B may be any of the materials described as examples of the material of the transparent substrate 11.

The adhesive layer 14 is interposed between the first transparent substrate 11A and the second transparent substrate 11B, and the first transparent substrate 11A and the second transparent substrate 11B are bonded to each other by the adhesive layer 14. The adhesive layer 14 transmits light in the entire or part of the visible region. The adhesive layer 14 is preferably colorless and transparent. The adhesive layer 14 may have a single-layer structure made of an adhesive, or may be a multilayer including a layer made of an adhesive and a layer made of an anchoring agent.

The first image carrier 20A faces the light shielding layer 12 via the first transparent substrate 11A. The first image carrier 20A includes the image recording layer 22 and the protective layer 21 sequentially from the first transparent substrate 11A side. The protective layer 21 and the image recording layer 22 of the first image carrier 20A are the same as the protective layer 21 and the image recording layer 22 described in the first embodiment.

The second image carrier 20B faces the light shielding layer 12 via the second transparent substrate 11B. The second image carrier 20B includes the image recording layer 22 and the protective layer 21 sequentially from the second transparent substrate 11B side. The protective layer 21 and the image recording layer 22 of the second image carrier 20B are the same as the protective layer 21 and the image recording layer 22 described in the first embodiment.

The first adhesive layer 30A is interposed between the mask layer 10 and the first image carrier 20A. The mask layer 10 and the first image carrier 20A are bonded to each other by the first adhesive layer 30A so that the light shielding layer 12 and the image recording layer 22 of the first image carrier 20A face each other via the first transparent substrate 11A. The first adhesive layer 30A transmits light in the entire or part of the visible region. The first adhesive layer 30A is preferably colorless and transparent. The first adhesive layer 30A may be a single layer made of an adhesive, or may be a multilayer including a layer made of an adhesive and a layer made of an anchoring agent.

The second adhesive layer 30B is interposed between the mask layer 10 and the second image carrier 20B. The mask layer 10 and the second image carrier 20B are bonded to each other by the second adhesive layer 30B so that the light shielding layer 12 and the image recording layer 22 of the second image carrier 20B face each other via the second transparent substrate 11B. The second adhesive layer 30B transmits light in the entire or part of the visible region. The second adhesive layer 30B is preferably colorless and transparent. The second adhesive layer 30B may be a single layer made of an adhesive, or may be a multilayer including a layer made of an adhesive and a layer made of an anchoring agent.

In the display 1, the distance from the light shielding layer 12 to the image recording layer 22 of the second image carrier 20B is equal to the distance from the light shielding layer 12 to the image recording layer 22 of the first image carrier 20A. Furthermore, the positions of the orthogonal projections of the colored portions 22P1 and 22P1 in the image recording layer 22 of the second image carrier 20B on a plane parallel to the major surface of the light shielding layer 12 are the same as the respective positions of the orthogonal projections of the colored portions 22P1 and 22P2 in the image recording layer 22 of the first image carrier 20A on the plane.

The display 1 can display different images according to the observation condition as described below.

For example, under the same observation condition as the observation condition described with reference to FIG. 6 except that the display 1 is placed so that the mask layer 10 and the second image carrier 20B are located between the black surface and the first image carrier 20A, the display 1 displays the same visible image as the visible image described with reference to FIG. 7.

Under the same observation condition as the observation condition described with reference to FIG. 8 except that the display 1 is placed so that the mask layer 10 and the second image carrier 20B are located between the black surface and the first image carrier 20A, the display 1 displays the same visible image as the visible image described with reference to FIG. 9.

Under the same observation condition as the observation condition described with reference to FIG. 6 except that the display 1 is placed so that the mask layer 10 and the first image carrier 20A are located between the black surface and the second image carrier 20B, the display 1 displays the same visible image as the visible image described with reference to FIG. 7.

Under the same observation condition as the observation condition described with reference to FIG. 8 except that the display 1 is placed so that the mask layer 10 and the first image carrier 20A are located between the black surface and the second image carrier 20B, the display 1 displays the same visible image as the visible image described with reference to FIG. 9.

Under the same observation condition as the observation condition described with reference to FIG. 10 except that the display 1 is placed so that the first image carrier 20A is located between the mask layer 10 and the observer OB and that the second image carrier 20B is located between the mask layer 10 and the light source LS, the display 1 displays the same visible image as the visible image described with reference to FIG. 7. In this state, when the display 1 is slightly rotated about an axis parallel to the X direction, the visible image displayed by the display 1 is changed from the visible image shown in FIG. 7 to the visible image shown in FIG. 9.

Thus, the display 1 can display various images according to the observation condition. That is, the display 1 can display special images.

Second Modification

In a second modification, the display 1 according to the second embodiment is modified as follows.

That is, in the display 1 described with reference to FIG. 16, some of the colored portions 22P1 and some of the colored portions 22P2 are omitted from the image recording layer 22 of the first image carrier 20A. Furthermore, some of the colored portions 22P1 and some of the colored portions 22P2 are omitted from the image recording layer 22 of the second image carrier 20B.

In the image recording layer 22 of the second image carrier 20B, the colored portions 22P1 are omitted at the positions corresponding to the positions of the colored portions 22P1 left in the image recording layer 22 of the first image carrier 20A, and the colored portions 22P1 are left at the positions corresponding to the positions of the colored portions 22P1 omitted from the image recording layer 22 of the first image carrier 20A. Furthermore, in the image recording layer 22 of the second image carrier 20B, the colored portions 22P2 are omitted at the positions corresponding to the positions of the colored portions 22P2 left in the image recording layer 22 of the first image carrier 20A, and the colored portions 22P2 are left at the positions corresponding to the positions of the colored portions 22P2 omitted from the image recording layer 22 of the first image carrier 20A.

The display 1 of the second modification can display images different from the images displayed by the display 1 according to the second embodiment, as described below.

For example, under the same observation condition as the observation condition described with reference to FIG. 6 except that the display 1 is placed so that the mask layer 10 and the second image carrier 20B are located between the black surface and the first image carrier 20A, the display 1 displays a visible image partially different from the visible image described with reference to FIG. 7.

Under the same observation condition as the observation condition described with reference to FIG. 8 except that the display 1 is placed so that the mask layer 10 and the second image carrier 20B are located between the black surface and the first image carrier 20A, the display 1 displays a visible image partially different from the visible image described with reference to FIG. 9.

Under the same observation condition as the observation condition described with reference to FIG. 6 except that the display 1 is placed so that the mask layer 10 and the first image carrier 20A are located between the black surface and the second image carrier 20B, the display 1 displays a visible image partially different from the visible image described with reference to FIG. 7.

Under the same observation condition as the observation condition described with reference to FIG. 8 except that the display 1 is placed so that the mask layer 10 and the first image carrier 20A are located between the black surface and the second image carrier 20B, the display 1 displays a visible image partially different from the visible image described with reference to FIG. 9.

Under the same observation condition as the observation condition described with reference to FIG. 10 except that the display 1 is placed so that the first image carrier 20A is located between the mask layer 10 and the observer OB and that the second image carrier 20B is located between the mask layer 10 and the light source LS, the display 1 displays the same visible image as the visible image described with reference to FIG. 7. In this state, when the display 1 is slightly rotated about an axis parallel to the X direction, the visible image displayed by the display 1 is changed from the visible image shown in FIG. 7 to the visible image shown in FIG. 9.

Thus, the display 1 can display various images according to the observation condition. Furthermore, the display 1 displays different visible images depending on which of the reflected light and the transmitted light is observed under the observation condition. That is, the display 1 can display special images.

Third Modification

In a third modification, the display 1 according to the second embodiment is modified as follows.

That is, in the display 1 described with reference to FIG. 16, the arrangement of the first display region PR1 and the second display region PR2 in the image recording layer 22 of the second image carrier 20B is different from the arrangement of the first display region PR1 and the second display region PR2 in the image recording layer 22 of the first image carrier 20A. For example, in the image recording layer 22 of the first image carrier 20A, the first display region PR1 has a circular shape, and the second display region PR2 is provided to surround the first display region PR1. In the image recording layer 22 of the second image carrier 20B, the first display region PR1 has a star shape, and the second display region PR2 is provided to surround the first display region PR1.

The display 1 of the second modification can display images different from the images displayed by the display 1 according to the second embodiment, as described below.

Under the same observation condition as the observation condition described with reference to FIG. 6 except that the display 1 is placed so that the mask layer 10 and the second image carrier 20B are located between the black surface and the first image carrier 20A, the display 1 displays a visible image including a circular pattern colored in the color of the colored portions 22P1 and a background pattern colored in the color of the colored portions 22P2.

Under the same observation condition as the observation condition described with reference to FIG. 8 except that the display 1 is placed so that the mask layer 10 and the second image carrier 20B are located between the black surface and the first image carrier 20A, the display 1 displays a visible image including a circular pattern colored in the color of the colored portions 22P2 and a background pattern colored in the color of the colored portions 22P1.

Under the same observation condition as the observation condition described with reference to FIG. 6 except that the display 1 is placed so that the mask layer 10 and the first image carrier 20A are located between the black surface and the second image carrier 20B, the display 1 displays a visible image including a star pattern colored in the color of the colored portions 22P1 and a background pattern colored in the color of the colored portions 22P2.

Under the same observation condition as the observation condition described with reference to FIG. 8 except that the display 1 is placed so that the mask layer 10 and the first image carrier 20A are located between the black surface and the second image carrier 20B, the display 1 displays a visible image including a star pattern colored in the color of the colored portions 22P2 and a background pattern colored in the color of the colored portions 22P1.

Under the same observation condition as the observation condition described with reference to FIG. 10 except that the display 1 is placed so that the first image carrier 20A is located between the mask layer 10 and the observer OB and that the second image carrier 20B is located between the mask layer 10 and the light source LS, the display 1 displays an image obtained by superimposing the visible image including the circular pattern colored in the color of the colored portions 22P1 and the background pattern colored in the color of the colored portions 22P2 on the visible image including the star pattern colored in the color of the colored portions 22P1 and the background pattern colored in the color of the colored portions 22P2. In this state, when the display 1 is slightly rotated about an axis parallel to the X direction, the visible image displayed by the display 1 is changed to an image obtained by superimposing the visible image including the circular pattern colored in the color of the colored portions 22P2 and the background pattern colored in the color of the colored portions 22P1 on the visible image including the star pattern colored in the color of the colored portions 22P2 and the background pattern colored in the color of the colored portions 22P1.

Thus, the display 1 can display various images according to the observation condition. Furthermore, the display 1 displays different visible images depending on which of the reflected light and the transmitted light is observed under the observation condition. That is, the display 1 can display special images in which the visible image is changed according to the observation condition.

Other Modifications

The display 1 according to the embodiments and modifications described above may be further modified.

For example, in the display 1 of the first embodiment, the colored portions 22P2 may be omitted.

The display 1 of the second embodiment may have the configuration described in the first modification.

The display 1 described above may have a configuration in which the shape of the pattern included in the visible image is changed according to the change in the incident angle of the illumination light IL or in the inclination angle of the display 1, in addition to or instead of the configuration in which the color of the visible image is changed according to the change in the incident angle of the illumination light IL or in the inclination angle of the display 1. The display 1 may be configured such that a moving image is displayed by changing the incident angle of the illumination light IL or the inclination angle of the display 1.

The light shielding layer 12 may be a light absorber instead of a reflector. For example, in the case where the light shielding layer 12 of the display 1 according to the first embodiment is a light absorber, under the observation condition described with reference to FIG. 6 and the observation condition described with reference to FIG. 8, the portion of the display 1 corresponding to the first display region PR1 and the portion of the display 1 corresponding to the second display region PR2 both appear in black. That is, these portions appear in the same color and cannot be distinguished from each other; thus, the latent image is not rendered visible.

Under the observation condition described with reference to FIG. 10, the display 1 displays the same visible image as the visible image described with reference to FIG. 7. In this state, when the display 1 is slightly rotated about an axis parallel to the X direction, the visible image displayed by the display 1 is changed from the visible image shown in FIG. 7 to the visible image shown in FIG. 9.

Furthermore, under the observation condition described with reference to FIG. 11, the display 1 displays the visible image described with reference to FIG. 7. Under the observation condition described with reference to FIG. 12, the display 1 displays the visible image described with reference to FIG. 9.

Thus, the display 1 including a light absorber instead of a reflector as the light shielding layer 12 can also display various images according to the observation condition.

In the case where the light shielding layer 12 is a reflector, the reflector may have a specular reflection surface by which illumination light is specularly reflected, or may be a light scattering layer by which illumination light is scattered. When the light shielding layer 12 has a specular reflection surface, the change in the visible image is clear. When the light shielding layer 12 is a light scattering layer, the visible image displayed with the reflected light can be visually recognized in a wide angular range.

The display 1 may be configured such that moiré is generated when the image recording layer 22 is superimposed on the light shielding layer 12. A visible image including moiré can be displayed, for example, when the pitch P1 of the slits SL is changed from an integral multiple of the pitch P2 of the cells C in the arrangement direction of the slits SL, or when the length direction of the slits SL is inclined with respect to the arrangement direction of the cells C. The display 1 may be configured such that moiré is generated when the image recording layer of a second image carrier or a third image carrier is superimposed on the light shielding layer 12 and that moiré is not generated when the image recording layer of a first image carrier is superimposed on the light shielding layer 12. Alternatively, the display 1 may be configured such that moiré is generated when the image recording layer of the first image carrier is superimposed on the light shielding layer 12 and that moiré is not generated when the image recording layer of the second image carrier or the third image carrier is superimposed on the light shielding layer 12. In such a case, the images displayed on the front and back of the display provide clearly different impressions, leading to less confusion between the front and back of the display under unfavorable conditions. The display 1 may be configured such that moiré is generated when the image recording layer of each of the first image carrier, the second image carrier, and the third image carrier is superimposed on the light shielding layer 12. The display 1 may be configured such that different moiré patterns are generated by superimposing the image recording layer of the first image carrier on the light shielding layer 12, by superimposing the image recording layer of the second image carrier on the light shielding layer 12, and by superimposing the image recording layer of the third image carrier on the light shielding layer 12. Alternatively, the display 1 may be configured such that the same moiré pattern is generated by superimposing the image recording layer of the first image carrier on the light shielding layer 12, by superimposing the image recording layer of the second image carrier on the light shielding layer 12, and by superimposing the image recording layer of the third image carrier on the light shielding layer 12. The different moiré patterns make counterfeiting more difficult, and the same moiré pattern further enhances the impression of the visible image.

Thus, the display 1 according to the embodiments and modifications of the present invention may be variously modified. The configurations of the first and second embodiments described above may be combined together, and the display of the present invention may have the above-described characteristics, features, functions, and effects of the first and second embodiments. The display of the present invention may have the above-described characteristics, features, functions, and effects of the first or second embodiment described above and the characteristics, features, functions, and effects of one or more of the modifications described above, as a modification of one or both of the first and second embodiments.

Application Examples

The display 1 may be used, for example, in identification (ID) cards such as employee ID cards, driver's licenses and student ID cards. The display 1 may also be used in securities such as bank notes, stock certificates, gift certificates, passenger tickets and admission tickets. The display 1 may also be used in payment cards, credit cards, ATM cards or membership cards. The display 1 may also be used in data pages of passports or visas.

Figure 17:
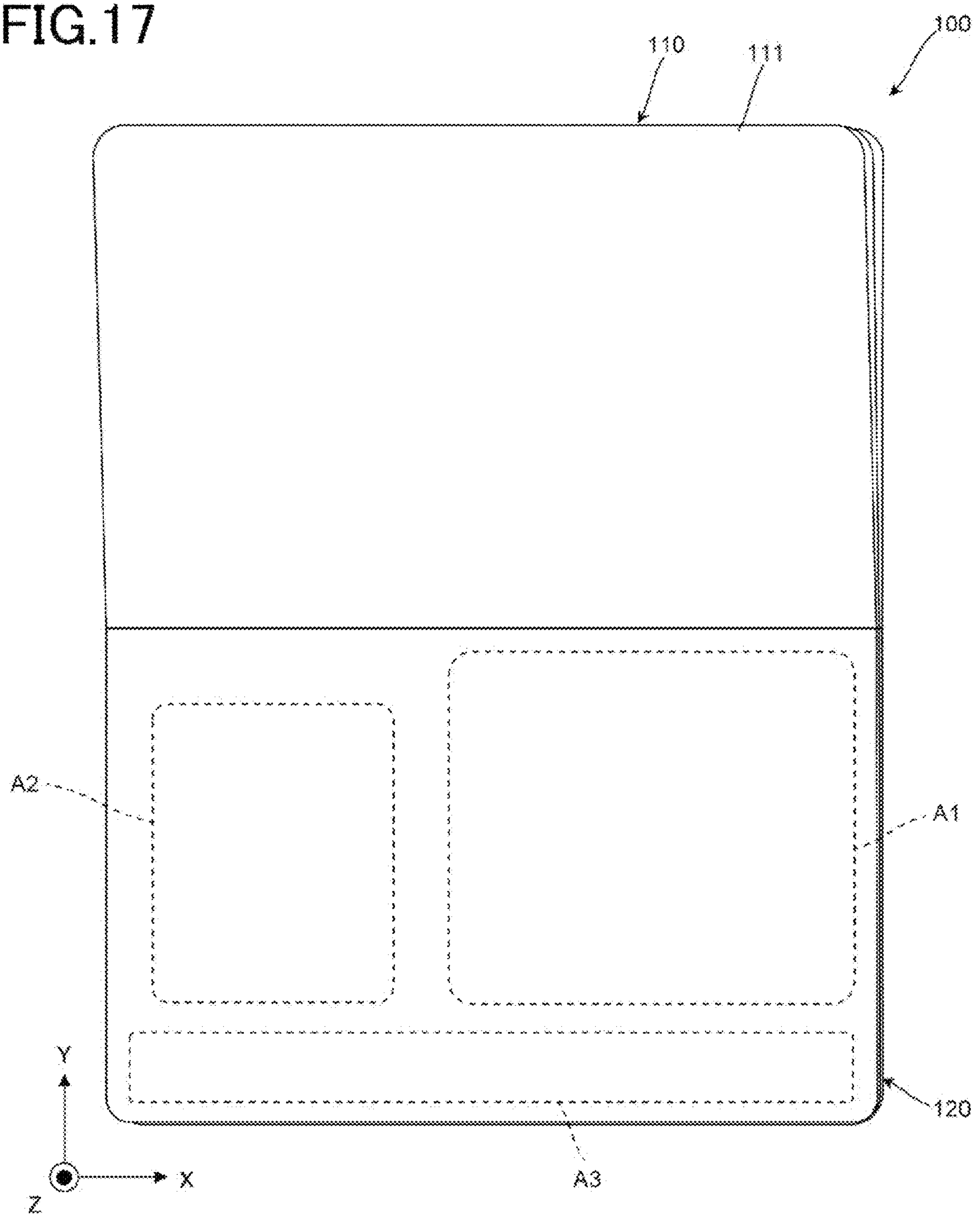
FIG. 17 is a schematic plan view of an application example of the display.

FIG. 17 is a schematic plan view of an application example of the display.

FIG. 17 shows a booklet 100 as an application example including the display. FIG. 17 shows the booklet 100 that is opened.

In this case, the booklet 100 is a passport. The booklet 100 may be other articles such as a passbook.

The booklet 100 includes a signature 110 and a cover 120.

The signature 110 is composed of one or more sheets 111. The signature 110 is composed of a single sheet 111 or a bundle of a plurality of sheets 111 folded in two. The one or more sheets 111 each may be a piece of paper, a polymer sheet, or a combination thereof.

The cover 120 is folded in two. The cover 120 and the signature 110 are stacked so that the signature 110 is located between portions of the cover 120 while the booklet 100 is closed. The cover 120 and the signature 110 are integrated together, for example, by being bound at the position at which the cover 120 and the signature 110 are folded.

One of the one or more sheets 111 has a first portion A1, a second portion A2, and a third portion A3.

In the second portion A2, a facial image is recorded. In the third portion A3, information that can be processed using optical character recognition is recorded. The information in the third portion A3 can be recorded by printing.

The first portion A1 is separated from the second portion A2 and the third portion A3. The first portion A1 is a portion to which the structure adopted as the display 1 is applied or in which the display 1 is provided. In the case where the one or more sheets 111 include a polymer sheet, the polymer sheet may be the transparent substrate 11 or a laminate of the first transparent substrate 11A and the second transparent substrate 11B, and the structure adopted as the display 1 may be applied to a portion (first portion A1) of the polymer sheet. Alternatively, in the case where a piece of paper is used as the one or more sheets 111, the piece of paper may have a window (first portion A1), and the display 1 may be provided at the position of the window.

The one or more sheets 111 may include, for example, an integrated circuit (IC) chip in which personal information is recorded, and an antenna that enables contactless communication between the IC chip and an external device. The IC chip and the antenna are provided in a portion of the one or more sheets 111 other than the first portion A1.

Figure 18:
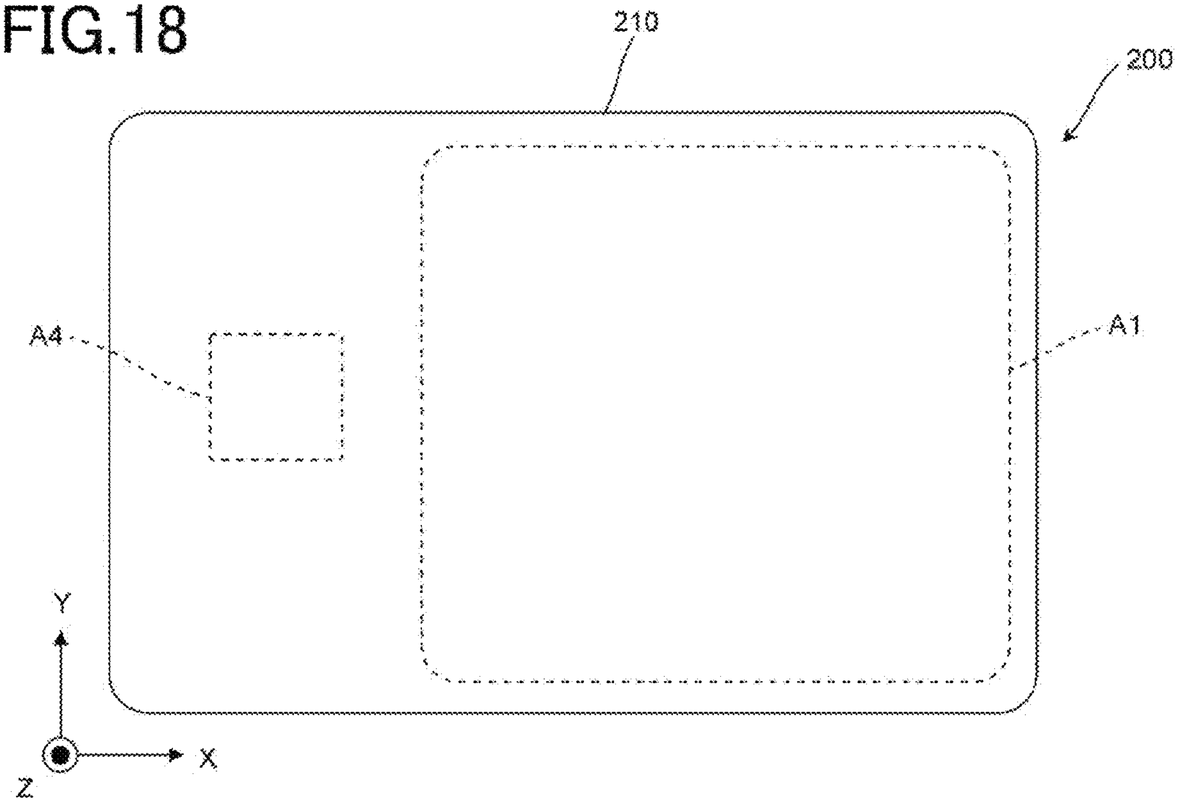
FIG. 18 is a schematic plan view of another application example of the display.

FIG. 18 is a schematic plan view of another application example of the display.

FIG. 18 shows a card 200 as another application example including the display.

The card 200 is an IC card. The card 200 includes a card body 210, and an IC chip (not shown).

The card body 210 includes, as a card substrate, the transparent substrate 11 or a laminate of the first transparent substrate 11A and the second transparent substrate 11B. The card body 210 has the first portion A1 and a fourth portion A4 that are separated from each other. The display 1 is provided in the first portion A1. The card body 210 includes the IC chip in the fourth portion A4.

Figure 19:
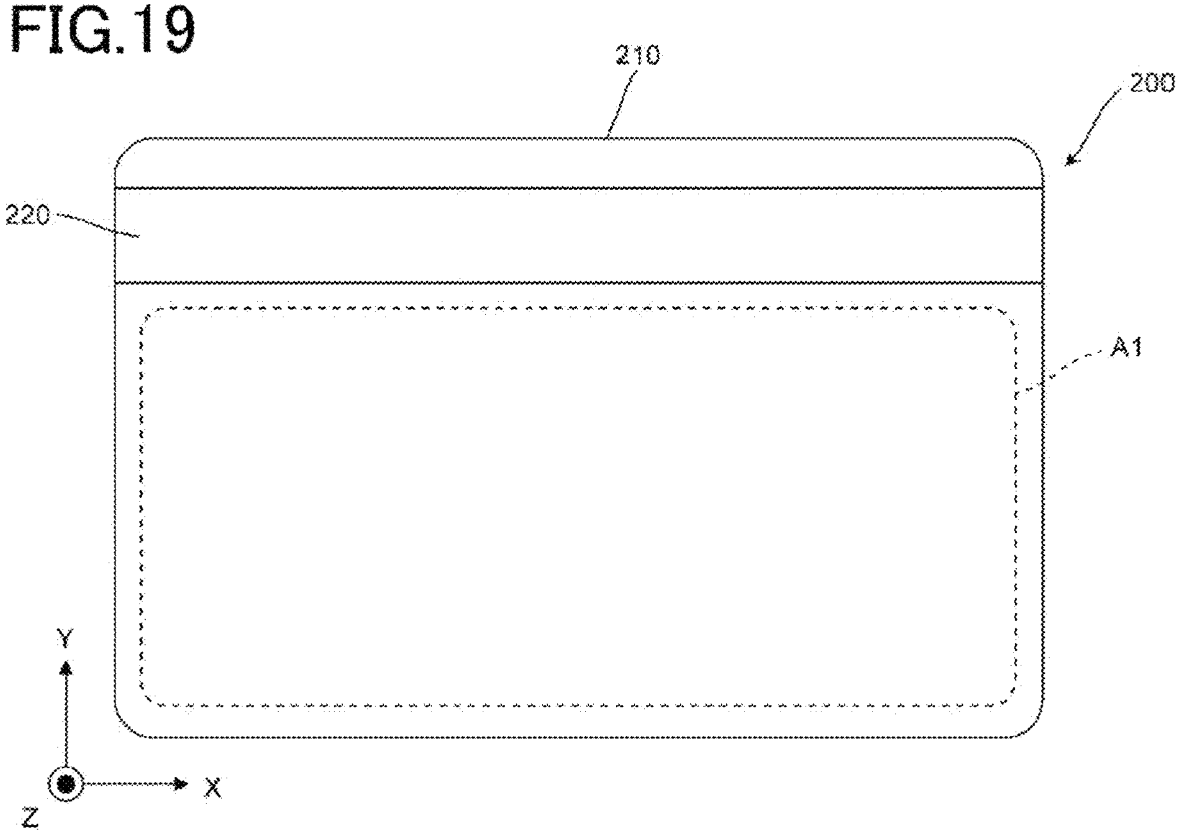
FIG. 19 is a schematic plan view of still another application example of the display.

FIG. 19 is a schematic plan view of still another application example of the display.

FIG. 19 shows the card 200 as still another application example of the display.

The card 200 is a magnetic card. The card 200 includes the card body 210, and a strip-shaped magnetic recording layer 220.

The card body 210 includes, as a card substrate, the transparent substrate 11 or a laminate of the first transparent substrate 11A and the second transparent substrate 11B. The card body 210 has the first portion A1. The structure adopted as the display 1 is applied to the first portion A1. The magnetic recording layer 220 is provided at a position on the card body 210 that is separated from the first portion A1.

Figure 20:
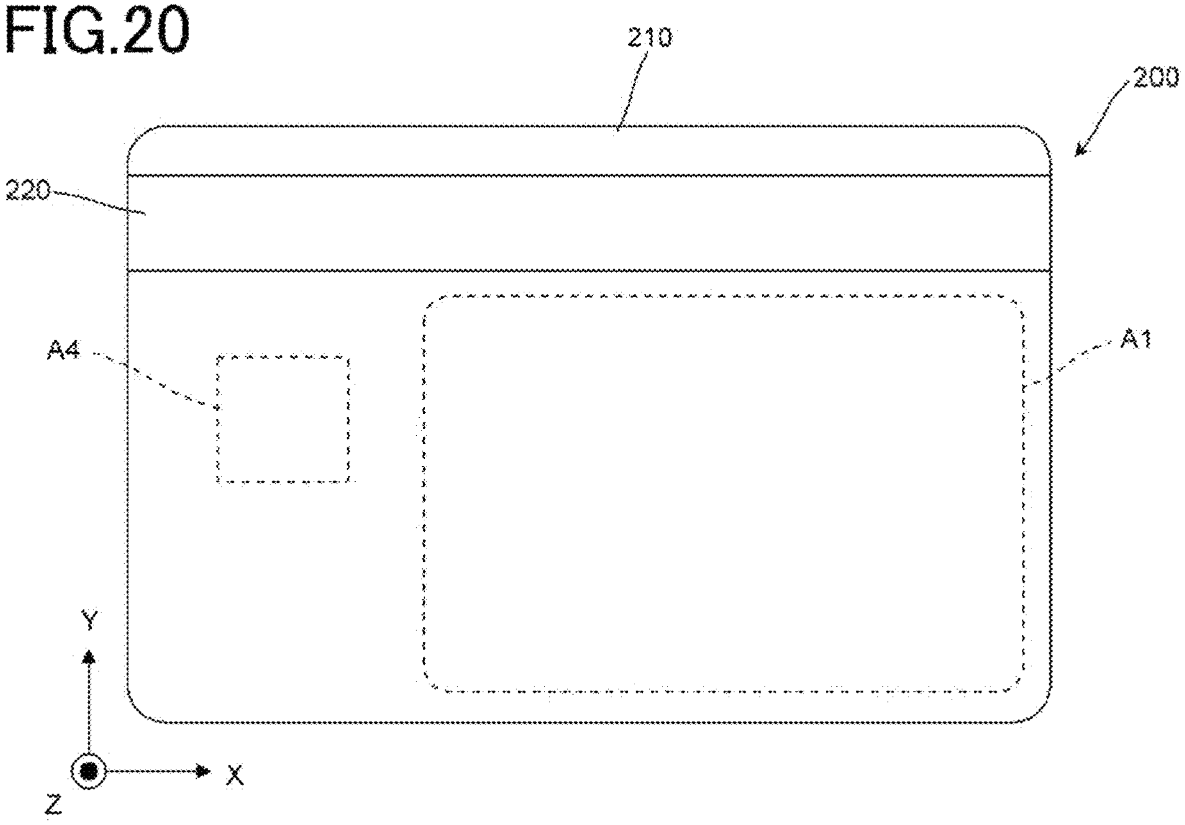
FIG. 20 is a schematic plan view of still another application example of the display.

FIG. 20 is a schematic plan view of still another application example of the display.

FIG. 20 shows the card 200 as still another application example of the display.

The card 200 is a magnetic card with an IC chip. The card 200 includes the card body 210, the strip-shaped magnetic recording layer 220, and an IC chip (not shown).

The card body 210 includes, as a card substrate, the transparent substrate 11 or a laminate of the first transparent substrate 11A and the second transparent substrate 11B. The card body 210 has the first portion A1 and a fourth portion A4 that are separated from each other. The display 1 is provided in the first portion A1. The card body 210 includes the IC chip in the fourth portion A4. The magnetic recording layer 220 is provided at a position on the card body 210 that is separated from the first portion A1.

Thus, the display 1 may have various applications.

REFERENCE SIGNS LIST

1 . . . Display; 10 . . . Mask layer; 11 . . . Transparent substrate; 11A . . . First transparent substrate; 11B . . . Second transparent substrate; 12 . . . Light shielding layer; 13 . . . Protective layer; 14 . . . Adhesive layer; 20 . . . Image carrier; 20A . . . First image carrier; 20B . . . Second image carrier; 21 . . . Protective layer; 22 . . . Image recording layer; 22P1 . . . Colored portion; 22P2 . . . Colored portion; 22P3 . . . Colored portion; 30 . . . Adhesive layer; 30A . . . First adhesive layer; 30B . . . Second adhesive layer; 100 . . . Booklet; 110 . . . Signature; 111 . . . Sheet; 120 . . . Cover; 200 . . . Card; 210 . . . Card body; 220 . . . Magnetic recording layer; A1 . . . First portion; A2 . . . Second portion; A3 . . . Third portion; A4 . . . Fourth portion; C . . . Cell; IL . . . Illumination light; LS . . . Light source; OB . . . Observer; PR1 . . . First display region; PR2 . . . Second display region; RL . . . Reflected light; SL . . . Slit; TL . . . Transmitted light.

What is claimed is:

1. A display, comprising:

a light shielding layer having a plurality of slits arranged at intervals in a width direction of the slits;

a first image recording layer that faces a first major surface of the light shielding layer at an interval and in which a first latent image is recorded, the first latent image being partially concealed by the light shielding layer in such way so that first latent image remains visually recognizable when viewed through the light shielding layer; and a second image recording layer that faces a second major surface of the light shielding layer at an interval and in which a second latent image is recorded, the second latent being partially concealed by the light shielding layer, in such way so that second latent image remains visually recognizable when viewed through the light shielding layer.

2. The display of claim 1, wherein a distance from the light shielding layer to the first image recording layer is in a range of 50 μm to 2 mm.

3. The display of claim 1, wherein in response to the display being inclined about an axis parallel to a length direction of the plurality of slits, at least one of a color and a shape of a first visible image changes, the first visible image being displayed when the first latent image is rendered visible by being partially concealed by the light shielding layer.

4. The display of claim 1, wherein moiré is generated when the first latent image is partially concealed by the light shielding layer.

5. The display of claim 1, further comprising a transparent substrate that is interposed between the light shielding layer and the first image recording layer.

6. The display of claim 1, wherein in response to the display being inclined about an axis parallel to a length direction of the plurality of slits, at least one of a color and a shape of a second visible image changes, the second visible image being displayed when the second latent image is rendered visible by being partially concealed by the light shielding layer.

7. The display of claim 1, wherein moiré is generated when the second latent image is partially concealed by the light shielding layer.

8. The display of claim 1, wherein a distance from the light shielding layer to the second image recording layer is in a range of 50 μm to 2 mm.

9. The display of claim 1, further comprising:

a first transparent substrate that is interposed between the light shielding layer and the first image recording layer; and a second transparent substrate that is interposed between the light shielding layer and the second image recording layer.

10. The display of claim 1, wherein a pitch P1 of the plurality of slits is in a range of 50 μm to 500 μm.

11. The display of claim 1, wherein the light shielding layer is a reflector.

12. The display of claim 1, wherein the light shielding layer is a vapor-deposited metal layer.

13. The display of claim 1, wherein the light shielding layer has a colored pattern that is formed by laser beam drawing on a layer containing a thermosensitive coloring agent, or has a black pattern that is formed due to carbonization by laser engraving.

14. A card comprising the display of claim 1.

15. A booklet data page comprising the display of claim 1.

16. The display of claim 1, wherein a ratio W2/P1 between a width W2 of the plurality of slits and a pitch P1 of the plurality of slits is in a range of 1/5 to 2/3.

17. A display, comprising:

a light shielding layer having a plurality of slits arranged at intervals in a width direction of the slits; and a first image recording layer that faces a first major surface of the light shielding layer at an interval and in which a first latent image is recorded, the first latent image being partially concealed by the light shielding layer in such way so that first latent image remains visually recognizable when viewed through the light shielding layer, wherein the light shielding layer has a colored pattern that is formed by laser beam drawing on a layer containing a thermosensitive coloring agent, or has a black pattern that is formed due to carbonization by laser engraving.

* * * * *